(12) United States Patent
Takuno et al.

(10) Patent No.: US 7,899,447 B2
(45) Date of Patent: Mar. 1, 2011

(54) TELEPHONE AND METHOD OF CONTROLLING TELEPHONE

(75) Inventors: Shinji Takuno, Tottori (JP); Teruyuki Yorita, Tottori (JP); Masashi Kakimoto, Tottori (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 742 days.

(21) Appl. No.: 11/915,808

(22) PCT Filed: May 31, 2006

(86) PCT No.: PCT/JP2006/310854

§ 371 (c)(1),
(2), (4) Date: Nov. 28, 2007

(87) PCT Pub. No.: WO2006/129692

PCT Pub. Date: Dec. 7, 2006

(65) Prior Publication Data

US 2009/0280789 A1    Nov. 12, 2009

(30) Foreign Application Priority Data

Jun. 1, 2005 (JP) ............................. 2005-161382
Jun. 6, 2005 (JP) ............................. 2005-165478
Jun. 14, 2005 (JP) ............................. 2005-173822
Jan. 31, 2006 (JP) ............................. 2006-022825
Feb. 24, 2006 (JP) ............................. 2006-048354

(51) Int. Cl.
*H04M 3/00* (2006.01)

(52) U.S. Cl. ..................... 455/418; 455/426.1; 455/456; 455/566; 455/420; 455/437; 455/414; 455/428; 455/500; 455/509; 370/338; 370/352; 370/260; 370/390; 370/351; 370/335; 370/329; 370/389; 370/353; 370/259; 370/395; 370/442; 370/342

(58) Field of Classification Search ................. 704/246; 455/426.1, 426.2, 456.1, 30.6, 343.3, 550.1, 455/566, 420, 437, 436, 414.1, 428, 500, 455/509, 517, 405; 370/338, 352, 260, 390, 370/351, 426.1, 493, 311, 241, 335, 329, 370/389, 401, 468, 202.01, 395.64, 342, 370/442, 353, 259; 379/202.01

See application file for complete search history.

(56) References Cited

U.S. PATENT DOCUMENTS

| | | |
|---|---|---|
| 6,696,956 B1 | 2/2004 | Uchida et al. |
| 2005/0013426 A1 | 1/2005 | Ooki |
| 2009/0015560 A1 * | 1/2009 | Robinson et al. ............ 345/168 |
| 2009/0222265 A1 * | 9/2009 | Iwamiya et al. ............. 704/246 |

FOREIGN PATENT DOCUMENTS

| | | | |
|---|---|---|---|
| EP | 1492318 A1 | | 12/2004 |
| JP | 6-37899 A | | 2/1994 |
| JP | 7-123138 A | | 5/1995 |
| JP | 7-264297 A | | 10/1995 |
| JP | 8-46697 A | | 2/1996 |
| JP | 11252283 A | * | 9/1999 |
| JP | 2001-28644 A | | 1/2001 |
| JP | 2002-125012 A | | 4/2002 |
| JP | 2002-152334 A | | 5/2002 |
| JP | 2002-171335 A | | 6/2002 |
| JP | 2003-163971 A | | 6/2003 |
| JP | 2004-23374 A | | 1/2004 |
| JP | 2004-64647 A | | 2/2004 |
| JP | 2004-147101 A | | 5/2004 |
| JP | 2004-214934 A | | 7/2004 |
| JP | 2004-235778 A | | 8/2004 |
| JP | 2004-297497 A | | 10/2004 |
| JP | 2004-336140 A | | 11/2004 |
| JP | 2004-363701 A | | 12/2004 |
| JP | 2005-18194 A | | 1/2005 |
| JP | 2005-190287 A | | 7/2005 |
| WO | 00-68913 A1 | | 11/2000 |

OTHER PUBLICATIONS

Translation of the International Preliminary Report on Patentability of International Application No. PCT/JP 2006/310854, with Form PCT/IB/373 and Form PCT/ISA/237.
International Search Report of PCT/JP2006/310854, date of mailing Jul. 4, 2006.

* cited by examiner

*Primary Examiner*—Kamran Afshar
*Assistant Examiner*—Joseph Arevalo
(74) *Attorney, Agent, or Firm*—Westerman, Hattori, Daniels & Adrian, LLP

(57) ABSTRACT

In a telephone having a presence function, it is possible to easily register a presence state. The telephone includes: presence detection means for detecting a presence state of a user; a presence state storage unit for storing the presence state detected by the presence detection means; and control means having a presence modification function for modifying the presence information stored in the presence state storage unit according to the user presence state detected by the presence detection means. When the presence detection means has detected a presence of a user, the control means modifies the presence information stored in the presence state storage unit to presence information indicating a presence. When the presence detection means has detected an absence of the user, the control means modifies the presence information stored in the presence state storage unit to presence information indicating an absence. The control means registers the presence information stored in the presence state storage unit in a presence server.

15 Claims, 15 Drawing Sheets

PRESENCE MANAGEMENT INFORMATION
STORAGE UNIT

| IP TELEPHONE | TERMINAL ID | PW | STATE | REASON FOR NOT BEING PRESENT | LENGTH OF NON PRESENCE | INCOMING CALL TRANSFER DESTINATION | OTHER |
|---|---|---|---|---|---|---|---|
| 60 a | VoIP 1 | A A A A | NOT PRESENT | BUSINESS TRIP | - | TERMINAL ID | **** |
| 60 b | VoIP 2 | B B B B | PRESENT | | | | |
| 60 c | | | | | | | |
| | | | | | | | |
| | | | | | | | |
| | | | | | | | |
| | | | | | | | |
| | VoIPn | | | | | | |

Fig. 5

| TERMINAL ID | REGISTRATION PW | REMOTE | TARGET TERMINAL ID | REGISTRATION PW |
|---|---|---|---|---|
| VoIP 1 (60 a) | | | | |
| VoIP 2 (60 b) | B B B B | O N | VoIP 1 (60 a) | A A A A |
| | | | | |
| | | | | |
| | | | | |
| | | | | |
| | | | | |
| VoIP ** | | | | |

Fig. 8

| TERMINAL ID | TELEPHONE NUMBER SETTING A | | TELEPHONE NUMBER SETTING B | TELEPHONE NUMBER SETTING C |
| --- | --- | --- | --- | --- |
| | GROUP TELEPHONE NUMBER | INCOMING CALL ORDER | | |
| A | GROUP ** | 1 | -**-** | |
| B | GROUP ** | 2 | -**- | -**-** |
| C | GROUP ** | 3 | -**-** | |
| D | GROUP ** | 4 | -**-** | |
| | | | | |
| | | | | |
| N | | | -- | -**-** |

Fig.13

INCOMING CALL ENTRY SETTINGS

| TERMINAL ID | TELEPHONE NUMBER SETTING A | TELEPHONE NUMBER SETTING B | TELEPHONE NUMBER SETTING C |
|---|---|---|---|
| A | GROUP ** | -**-** | |
| ENTRY STORAGE | OFF | ON | |

Fig.14

INCOMING CALL ENTRY

| TERMINAL ID | TYPE | TIME | SELFSAME TELEPHONE NUMBER | COUNTERPART DESTINATION TELEPHONE NUMBER | COUNTERPART DESTINATION NAME |
|---|---|---|---|---|---|
| 1 | MISSED | 2005/11/30 (WED) 14:15:10 | 9999 | ********** | UNKNOWN |
| 2 | MISSED | 2005/11/30 (WED) 14:10:36 | 9999 | 123456789 | COMPANY A |
| 3 | MISSED | 2005/11/30 (WED) 14:02:55 | 1111 | 9876543210 | COMPANY B |
| 4 | MISSED | 2005/11/30 (WED) 13:46:24 | 9999 | ********** | UNKNOWN |
| 5 | MISSED | 2005/11/30 (WED) 13:37:46 | 2222 | 5555 | ADMINISTRA-TION SECTION |
|  |  |  |  |  |  |
|  |  |  |  |  |  |

Fig. 15

TELEPHONE AND METHOD OF CONTROLLING TELEPHONE

TECHNICAL FIELD

The present invention relates to a telephone and a method of controlling a telephone provided with a presence function, and more particularly relates to a telephone and a method of controlling a telephone that can easily register a presence state in a telephone having a presence function that registers and manages the presence, absence, or other presence states of a telephone user in an IP telephone device (IP telephone) that performs voice conversations using VoIP (Voice over Internet Protocol).

BACKGROUND ART

In recent years, IP telephone devices (IP telephones) that perform voice conversations using VoIP (Voice over Internet Protocol) are beginning to become more widespread. VoIP is a technology that achieves voice conversations on an IP network such as intranets and the Internet. With VoIP, digitally encoded voice conversations are segmented into fixed time intervals to form packets, which are sent via an IP network. There are advantages in that costs required for communications are lower than the use of a conventional telephone circuit because the line usage efficiency of an IP network is high.

Another characteristic of IP telephones is that a communication function other than voice communication can be implemented by using a protocol other than VoIP. When, for example, the device settings of an IP telephone are set, it is very laborious to input the settings of the device using the small display panel and the few operation buttons of an IP telephone. However, the settings of an IP telephone can be set from a PC browser, or, for example, the communication log of an IP telephone can be referenced from a PC browser, by using, e.g., HTTP (Hyper Text Transfer Protocol) and providing the IP telephone with a function that connects from the exterior (PC browser, for example).

In such an IP telephone system, audio is digitized, converted to IP packets, and made to flow through the IP network until reaching the destination of the telephone call. The IP packet received at the destination of the telephone call is restored to its original information, and in this manner, a telephone conversation can be carried out between the sender and the destination of the phone call.

With an IP network, the other party must be uniquely recognized by using an address such as an IP address that has been assigned to the machine. A device referred to as a gatekeeper is commonly used for this reason. A gatekeeper manages a database in which IP addresses and telephone numbers assigned to IP telephones are associated, and the IP address of a telephone as the destination of a telephone call can be specified by searching for the corresponding IP address in accordance with the telephone number specified by the IP telephone.

For example, in the IP telephone system disclosed in Patent Reference 1 (Japanese Laid-open Patent Application No. 2004-147101) described below, there is disclosed a gatekeeper device that is provided with telephone number assignment means in which a MAC address and an IP address are received from an IP telephone device before the IP telephone machine begins to operate, a telephone number set in advance on the basis of the address contained in the network address is assigned and notified to the IP telephone machine, and the telephone number, the IP address, and the MAC address are associated to perform registration and management. Using a device such as that disclosed in Patent Reference 1, the telephone number and other unique address and setting information can be automatically set for each user terminal when the power is switched on and at other times.

A presence function is a communication function other than voice communication implemented in an IP telephone. A presence function is a function for registering, managing, and transmitting the presence condition (presence state) of a user who is using a certain communication terminal (e.g., IP telephone). The user registers, in his own IP telephone, information that shows the presence state (e.g., in a meeting, out of the office, and other states), whereby the user's own presence state can be notified via the IP network to other users who are using an IP telephone.

For example, the state of counterpart users can thereby be known via the presence function before making a call from an IP telephone to an IP telephone. For this reason, time and communication expenses spent on the telephone are not wasted when a counterpart is not present, for example, because the user can confirm that the counterpart is away prior to making a call. When the counterpart user is, e.g., in a meeting, a user can decide whether to have the call transferred to the meeting room via another person, decide to wait for a while if the call is not urgent, or decide another course of action. In this manner, the presence function can be a function for assisting smooth communication between users.

An invention that utilizes a presence function is disclosed in, e.g., Patent Document 2 (Japanese Laid-open Patent Application No. 2005-18194) described below. With this invention, a communication switching system is disclosed in which a switching unit automatically transfers communications on the basis of the presence information of a user. In the system of Patent Reference 2, a presence table in which user-selectable presence states are consolidated into a list is stored in the memory of an IP telephone. Registered in the table are, e.g., present, out of the office, in a meeting, and other states of presence, and the user can select a presence from among these choices. When the user selects a presence, the presence registered in the IP telephone is notified as the presence state of the user to the switching unit, which has a presence server function.

The switching unit holds in memory a presence management table in which the presence states provided by the IP telephones are stored, and a user-classified transfer destination table in which transfer destinations corresponding to the presence of the user are stored. The switching unit thereby refers to the presence management table and checks the presence state of the user when a certain user receives a call. The switching unit acquires from the user-classified transfer destination table the transfer destination that corresponds to the presence state and performs a transfer process.

When the presence state of the user is, e.g., present, a transfer will not occur and a connection will be made to the IP telephone of the receiving destination. Also, calls will be transferred to a telephone in the meeting room when the presence state is "in a meeting," for example. Calls will be transferred to a user's mobile telephone if the presence state is "out of the office." In this manner, different transfer processes can be automatically performed for each presence state.

Disclosed in Patent Reference 3 (Japanese Laid-open Patent Application No. 2005-190287) described below is a gateway device and a presence display system in which presence information is synchronized among presence services that differ in SIP phone systems.

The presence display system disclosed in Patent Reference 3 is composed of a presence display system that includes mobile phones, and a SIP phone system that includes SIP phones and SIPB/W (enterprise side). The presence information of each user is stored in a presence server of the presence display system that includes mobile phones, and presence information of an SIP phone system that includes SIP phones and SIPB/W (enterprise side) is stored in the SIPG/W (enterprise side) When the presence information of the presence server has been changed, the presence server is configured to notify the SIPG/W (enterprise side) of the presence information modification via the SIPG/W (mobile communication network side); and, conversely, when the presence information of the SIP phone system has been changed, the SIPG/W (enterprise side) notifies the presence server of the presence modification via the SIPG/W (mobile communication network side).

[Patent Reference 1]: Japanese Laid-open Patent Application No. 2004-147101

[Patent Reference 2]: Japanese Laid-open Patent Application No. 2005-18194

[Patent Reference 3]: Japanese Laid-open Patent Application No. 2005-190287

DISCLOSURE OF THE INVENTION

Problems the Invention is Intended to Solve

IP telephones having a presence function such as that described above are convenient, but there is a drawback in that the user must take the trouble to change the presence state so as to correspond to the state of the user each time the presence state changes, and if the modification task is neglected, the actual state of the user will not conform to the presence state of the IP telephone. For example, in the case that the user of an IP telephone, which has been set to 'away' (not present), returns to his desk to make a call, the presence state remains 'away' even though the user is actually present, unless the presence state is explicitly changed to 'present' in addition to the operation of making a call.

However, in the systems disclosed in Patent References 2 and 3 described above, the setting and registration operation of the presence state must be performed by the user who uses the IP telephone. For this reason, there is a drawback in that the setting and registration of the presence state is troublesome, and when the setting and registration operations are not carried out when an operation should be carried out each time the state changes to present or not present, the presence state that is set and registered in the IP telephone and the management server will not conform to the actual presence state, and the presence state will remain in an incorrect presence state.

Also, when an IP telephone system provided with a presence server is installed in an office, the operation in which the user of each IP telephone registers presence information in the presence server in Patent References 2 and 3 described above must be carried out by individual users who will use the IP telephones. However, there are cases in which a secretary must use an IP telephone installed at the secretary's desk to register presence information in place of the IP telephone user.

For example, when the IP telephone of a company president is installed in the president's office and the IP telephone of the secretary is installed in the secretary's office, the secretary must be able to use his own IP telephone installed in the secretary's office to register in the presence server the presence information of the president's IP telephone installed in the president's office, i.e., the presence information or the like of the president. This is because it is not realistic for the president to operate his own IP telephone installed in the president's office and register his own presence information, and it is possible to consider that the secretary who manages the president's schedule will change the presence state. In such a case, it is sensible for the secretary to perform this operation using the secretary's IP telephone that is installed in the secretary's office rather than using the IP telephone that is installed in the president's office.

However, with the systems disclosed in Patent References 2 and 3 described above, there is a problem in that no consideration is given to the case in which the user of a specific IP telephone registers presence information in the presence server from another IP telephone, and a situation such as that described above cannot be accommodated.

The inventors of the present invention, as a result of thoroughgoing research to solve the above-described problems, perfected the present invention having found that the above described problems can be solved by providing the telephone with presence detection means for detecting information related to the presence state of normal user of the telephone to automatically change the presence state; or by providing the telephone with remote modification means for changing the presence information of the user of another telephone.

In other words, an object of the present invention is to solve the problems described above, and to provide a telephone and method of controlling a telephone in which the presence state can be set and registered in a simple manner in a telephone having a presence function. More particularly, an object is to address a first technical issue in which presence detection means for detecting the presence state of the normal user of the telephone is disposed in the telephone to allow the presence or non-presence of the normal user of the telephone to be detected and the presence state to be automatically set; and a second technical issue in which the presence state of a user of another specific telephone can be remotely set from a certain specific telephone.

Means for Solving the Abovementioned Problems

In order to solve the above-described problems, a first aspect of the present invention is a telephone that registers a presence state in a presence server having a presence management information storage unit for storing in each telephone the presence state of a user of the telephone, the telephone characterized in comprising:

presence detection means for detecting the presence state of a user;

a presence state storage unit for storing the presence state detected by the presence detection means; and control means having a presence modification function for changing the presence information stored in the presence state storage unit in accordance with the presence state of the user detected by the presence detection means, wherein the control means changes the presence information stored in the presence state storage unit to presence information that indicates presence when the presence detection means has detected that the user is present;

the control means changes the presence information stored in the presence state storage unit to presence information that indicates not present when the presence detection means has detected that the user is not present; and the control means registers in the presence server presence information stored in the presence state storage unit.

In the first aspect, the telephone is characterized by further comprising a presence table for enabling or disabling a presence modification function that changes presence information stored in the presence state storage unit for each of the presence states in accordance with the presence state detected by the presence detection means.

In the first aspect, the telephone is characterized in that the presence detection means detects an outgoing call made by the user of the telephone and detects the presence of the user, and detects that the user is not present when an outgoing call has not been detected for a prescribed interval set in advance.

In the first aspect, the telephone is characterized in further comprising voice recognition means for recognizing the voice of the user of the telephone, and the presence detection means detects the presence of the user when the voice recognition means detects the voice of the user, and detects that the user is not present when the voice of the user is not detected for a prescribed interval set in advance.

In the first aspect, the telephone is characterized in further comprising a charger for charging a mobile phone owned by the user of the telephone, wherein the presence detection means detects the presence of the user when the mobile phone owned by the user is set on the charger, and detects that the user is not present when the mobile phone is not set on the charger.

A second aspect is a telephone that registers a presence state in a presence server having a presence management information storage unit for storing in each telephone the presence state of a user of the telephone, the telephone characterized in comprising:

an operation input unit that includes a remote button for enabling a remote function for changing the presence information of another telephone; and a presence state storage unit for storing the presence state of a user, wherein the remote button is enabled from the operation input unit and remote terminal registration is carried out in the presence server, and presence information of the other telephone inputted from the operation input unit is registered in the presence server when the remote button has been operated.

In the second aspect, the telephone is characterized in that the telephone receives notification of the changed presence information from the presence server each time the presence information registered in the presence server is changed from the other telephone when the remote button is enabled and the remote terminal registration is carried out in the presence server.

In the second aspect, the telephone is characterized in that the telephone acquires presence information of the other telephone at a prescribed timing when the remote button is enabled and the remote terminal registration is carried out in the presence server.

A third aspect of the present invention is a method of controlling a telephone that registers a presence state in a presence server having a presence management information storage unit for storing in each telephone the presence state of a user of the telephone, wherein the telephone comprises presence detection means for detecting the presence state of a user; a presence state storage unit for storing the presence state detected by the presence detection means; and control means having a presence modification function for changing the presence information stored in the presence state storage unit in accordance with the presence state of the user detected by the presence detection means, the method characterized in comprising:

a step in which the control means changes the presence information stored in the presence state storage unit to presence information that indicates presence when the presence detection means has detected that the user is present;

a step in which the control means changes the presence information stored in the presence state storage unit to presence information that indicates not present when the presence detection means has detected that the user is not present; and a step in which the control means registers in the presence server presence information stored in the presence state storage unit.

In the third aspect, [the method] is characterized in that the telephone further comprises a presence table for enabling or disabling a presence modification function that changes presence information stored in the presence state storage unit for each of the presence states in accordance with the presence state detected by the presence detection means, and the method of controlling the telephone further comprises a step of enabling or disabling the presence modification function by rewriting the presence table using input means.

In the third aspect, [the method] is characterized in that the step of changing the presence information includes a process in which the presence detection means detects an outgoing call made by the user of the telephone and detects the presence of the user, and detects that the user is not present when an outgoing call has not been detected for a prescribed interval set in advance.

In the third aspect, [the method] is characterized in that the telephone further comprises voice recognition means for recognizing the voice of the user of the telephone, and the step of changing the presence information includes a process in which the presence detection means detects the presence of the user when the voice recognition means detects the voice of the user, and detects that the user is not present when the voice of the user is not detected for a prescribed interval set in advance.

In the third aspect, [the method] is characterized in that the telephone further comprises a charger for charging a mobile phone owned by the user of the telephone, and the step for changing the presence information includes a process in which the present detection means detects the presence of the user when the mobile phone owned by the user is set on the charger, and detects that the user is not present when the mobile phone is not set on the charger.

A fourth aspect is a method of controlling a telephone that registers a presence state in a presence server having a presence management information storage unit for storing in each telephone the presence state of a user of the telephone, wherein the telephone comprises an operation input unit that includes a remote button for enabling a remote function for changing the presence information of another telephone, and a presence state storage unit for storing the presence state of a user, the method characterized in comprising:

a step for enabling the remote button from the operation input unit and carrying out remote terminal registration in the presence server; and a step for registering, in the presence server, presence information of the other telephone inputted from the operation input unit when the remote button has been operated.

In the fourth aspect, [the method] is characterized by further having a step in which the telephone receives notification of the changed presence information from the presence server each time the presence information registered in the presence server is changed from the other telephone when the remote button is enabled and the remote terminal registration is carried out in the presence server.

In the fourth aspect, [the method] is characterized by further having a step in which the telephone acquires presence information of the other telephone at a prescribed timing when the remote button is enabled and the remote terminal registration is carried out in the presence server.

EFFECT OF THE INVENTION

In the first aspect of the present invention, the presence state of the user of a telephone can be detected and the presence information can be automatically set and changed in accordance with the presence state. Also, in the second aspect of the present invention a telephone can be remotely set and the presence state of a user of another specific telephone can be remotely set and registered. Furthermore, in the third aspect of the present invention, a method of control in the telephone according to the first aspect can be provided, and in the fourth aspect of the present invention, a method of control in the telephone according to the third aspect can be provided.

BRIEF DESCRIPTION OF THE DRAWINGS

FIG. 5 shows an example of the data configuration of presence information stored in the presence management information unit;

FIG. 8 is a diagram showing an example of the configuration of remote setting information registered in the remote terminal registration and authentication unit setting registration unit of the presence server;

remote terminal registration and authentication unit

Figure 9:
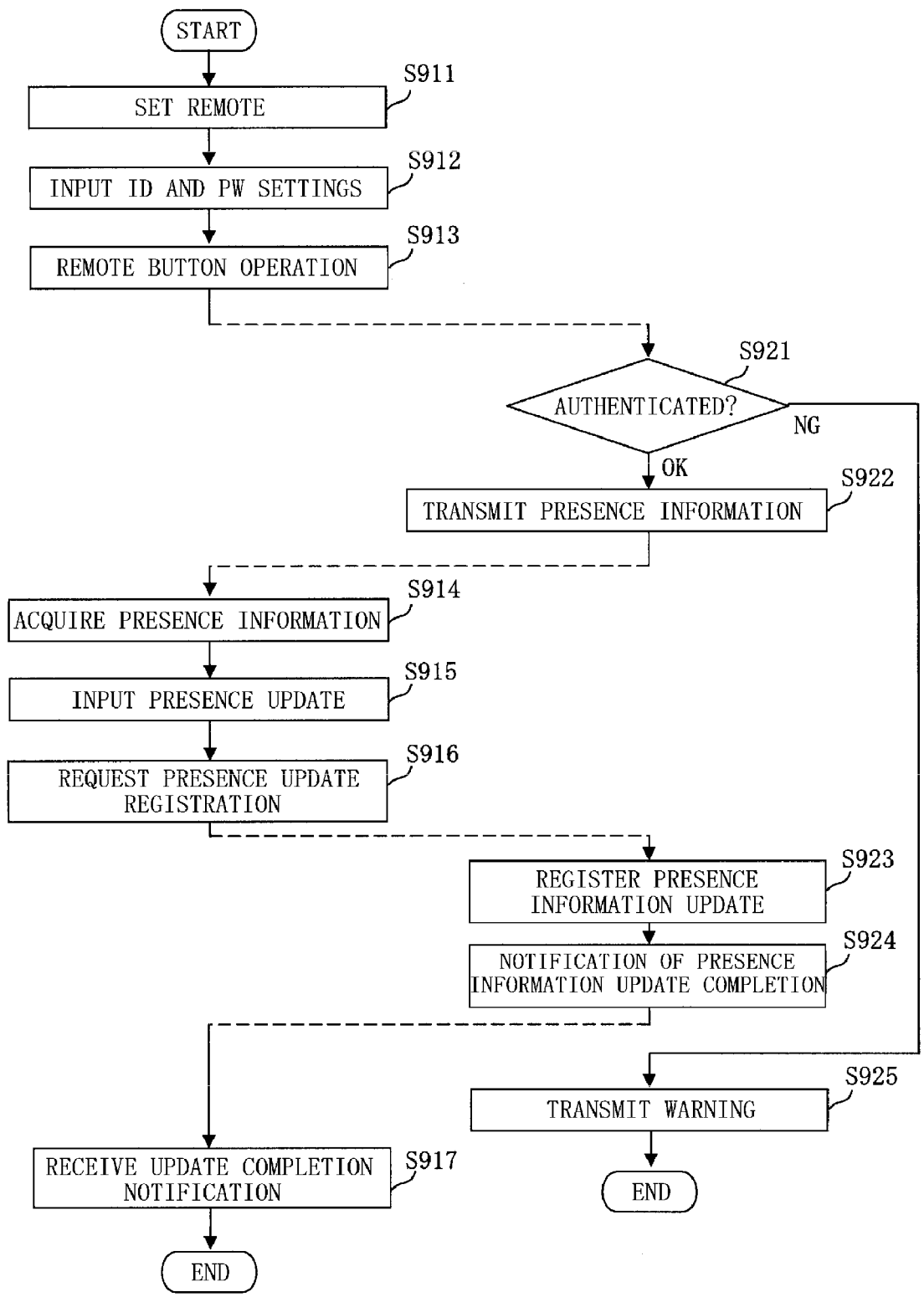
Figure 10:
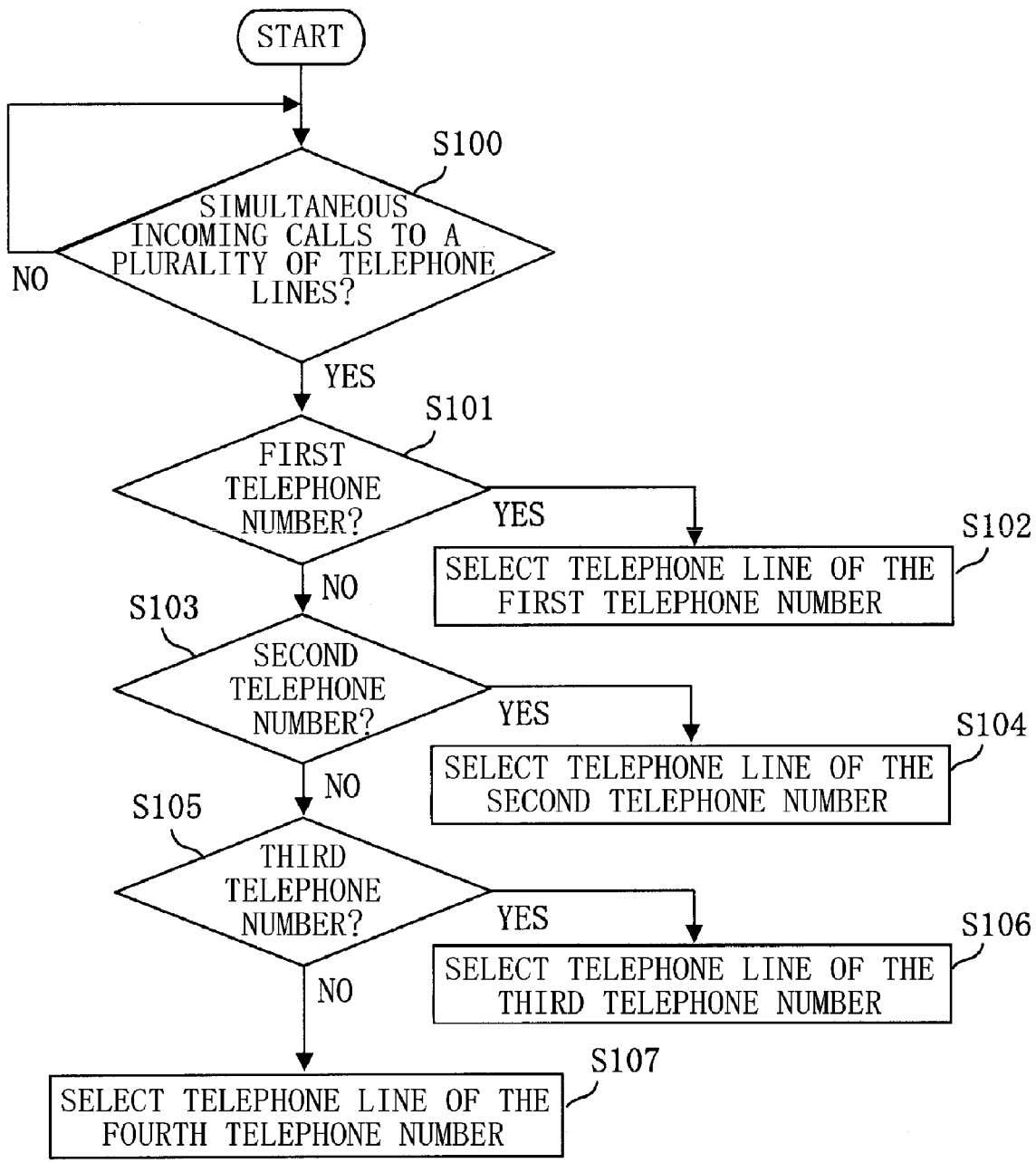
Figure 11:
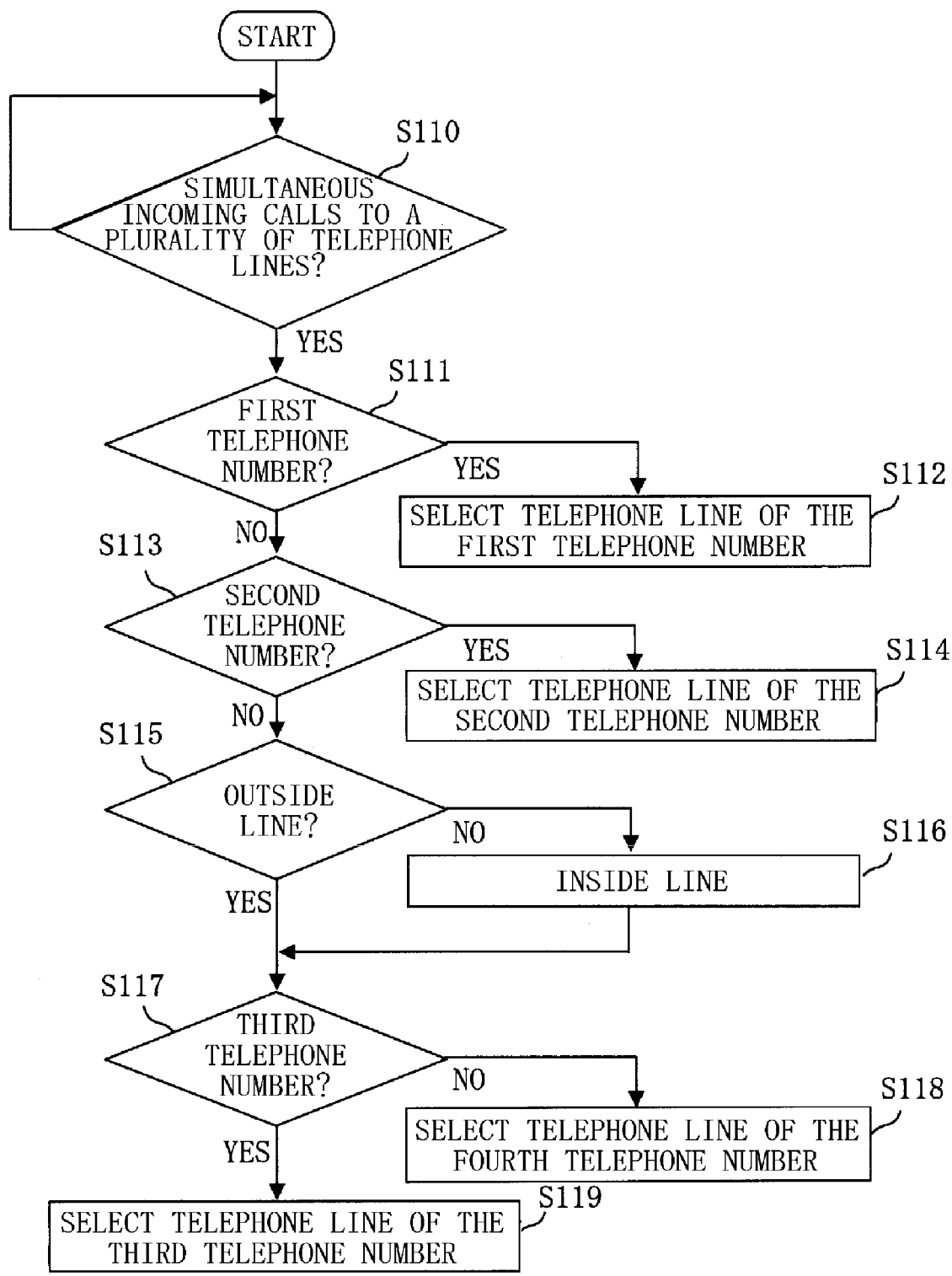
Figure 12:
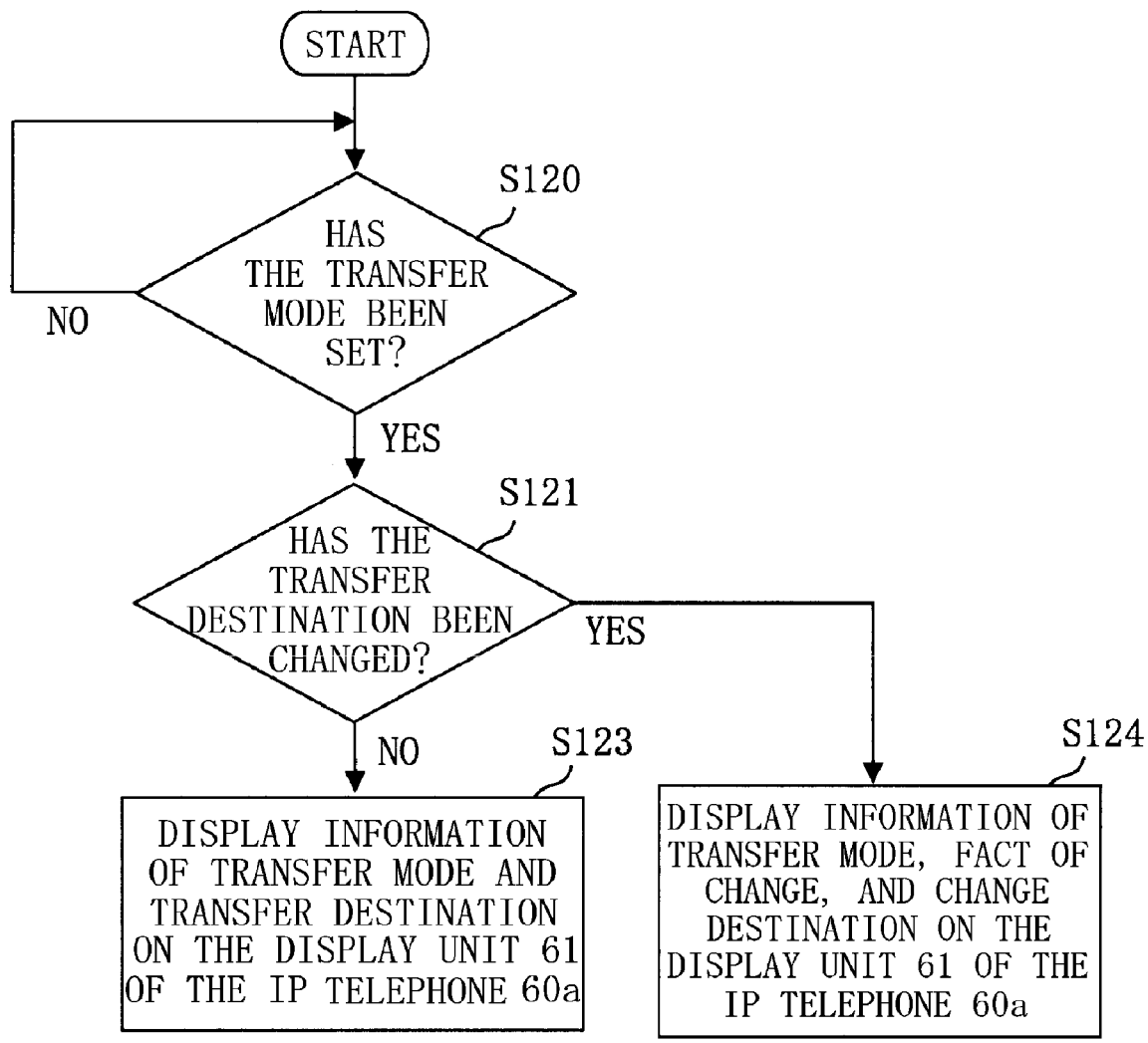

FIG. 9 is a flowchart showing the procedure for remotely changing the presence state carried out by the IP telephone according to embodiment 2 of the present invention;

FIG. 10 is a flowchart showing a procedure for receiving a call and performing control in accordance with the incoming call priority order set in the telephone;

FIG. 11 is a flowchart showing another procedure for receiving a call and performing control in accordance with the incoming call priority order set in the telephone;

FIG. 12 is a flowchart showing a procedure for displaying information on the display unit when transfer settings are being performed;

FIG. 13 is a diagram showing an example of telephone number settings and other data configurations of IP telephones stored in the RAM of the SIP server;

FIG. 14 is a diagram showing an example of incoming call entry settings that are set in the various settings storage unit of the IP telephone; and FIG. 15 is a diagram showing an example of the incoming call entry stored in memory.

KEY TO SYMBOLS 10 telephone system
11 Internet network
12 telephone circuit network
15 subscriber telephone
17, 20 routers
30 gateway
40 SIP server
41 CPU
42 operation input unit
43 RAM
50 presence server
51 presence management information storage unit
52 terminal setting information registration unit
53 remote terminal registration and authentication unit
60a to 60c IP telephones
61 display unit
62 operation input unit
63 presence detection means
64 control means
65 memory
651 presence table storage unit
652 presence state storage unit
653 remote setting storage unit
654 presence information acquisition storage unit
655 various settings storage unit

BEST MODE FOR CARRYING OUT THE INVENTION

Specific examples of the present invention will be described in detail hereinafter with reference to the drawings. However, the examples described below are exemplifications of the telephone and the method of controlling a telephone provided with a presence server that are used to embody the technical concepts of the present invention, are not intended to limit the present invention to this telephone and method of controlling a telephone and can be equally applied to a telephone and a method of controlling a telephone according to other embodiments within the scope of the claims.

Embodiment 1 of the Invention

Figure 1:
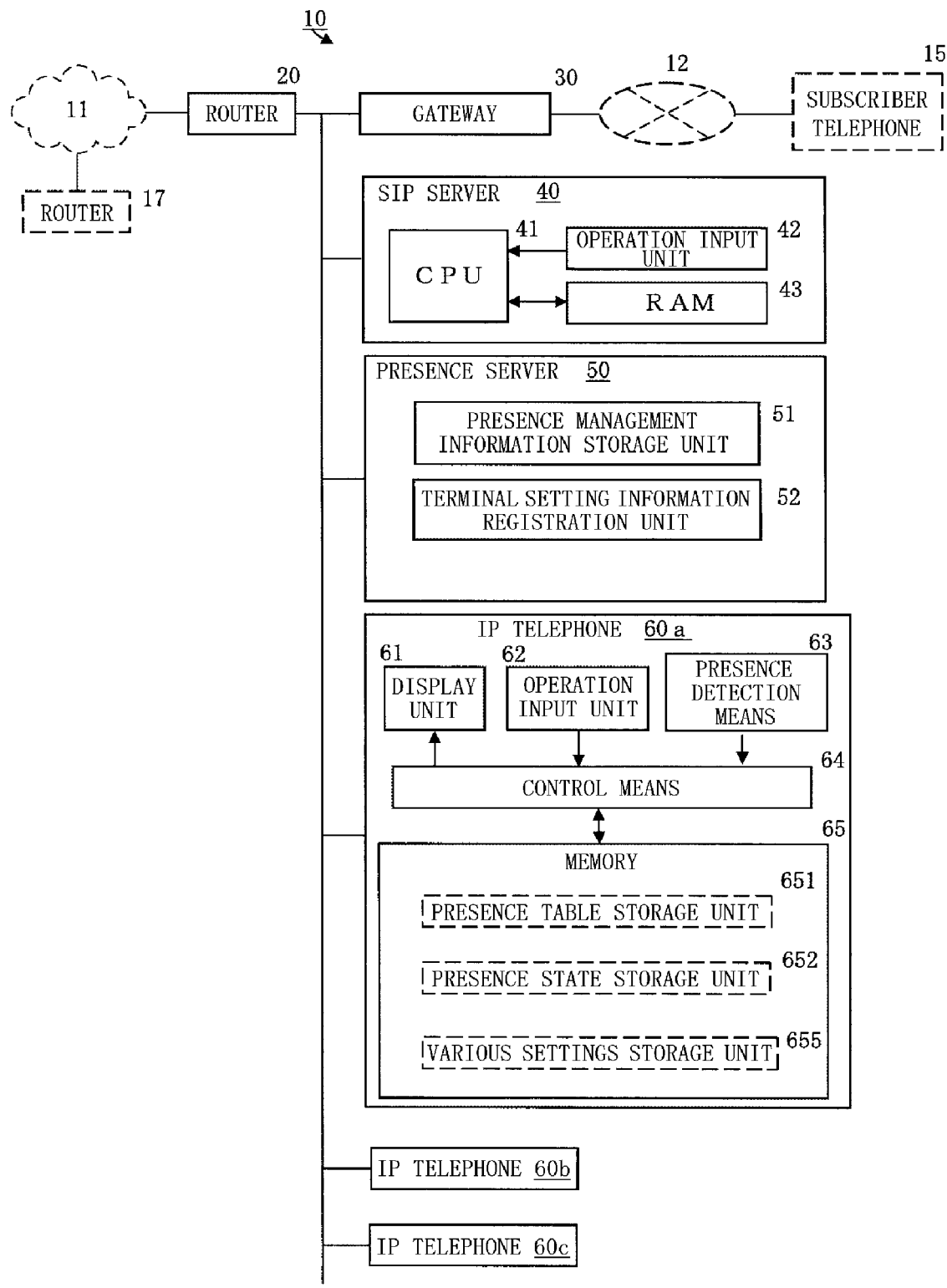
FIG. 1 is a block diagram showing the configuration of the telephone according to embodiment 1 of the present invention.

FIG. 1 is a block diagram showing the configuration of the telephone according to embodiment 1 of the present invention. The telephone of the present embodiment is a so-called IP telephones 60a, 60b, or 60c, and the IP telephone 60a, 60b, or 60c comprises control means 64r memory 65, an operation input unit 62 composed of a group of operation buttons, a display unit 61 composed of a liquid crystal display panel or the like, and presence detection means 63 for detecting the presence state of a user. The configuration of these components shown in FIG. 1 represent only the IP telephone 60a, and the IP telephone 60a will mainly be described below.

The IP telephone 60a or the like is connected via an IP network to a presence server 50, an SIP server 40 as a call connection control server, a gateway 30, and a router 20. A call between a subscriber telephone 15 connected to a telephone circuit network 12, and the IP telephone 60a or the like is connected via the gateway 30 on the basis of call connection control of the SIP server 40 inside the IP network. Also, a call between a telephone of another IP telephone system connected to the router 17 [and the IP telephone 60a] is connected via the Internet network 11 and the router 20 on the basis of call connection control of the SIP server 40.

The IP telephone 60a or the like is provided with a various settings storage unit 655 for storing in the memory 65 settings information set in the IP telephone 60a, and recorded in the various settings storage unit 655 are telephone numbers assigned by the system to the IP telephone 60a and the like, IP addresses, MAC addresses, and other settings information, as well as transfer settings set by the user in the IP telephone 60a and the like, settings related to recording incoming call logs, settings of the incoming call priority order, and other settings information.

The SIP server 40 is composed of a CPU 41 as control means, an operation input unit 42, and a RAM 43. The settings information set in the IP telephone 60a and the like are registered in the RAM 43 of the SIP server 40, and the SIP server 40 performs call connection control based on the presence information of the IP telephone 60a and the like registered in the RAM 43, and the presence information of the IP telephone 60a and the like registered in the presence server 50.

The presence server 50 is provided with a presence management information storage unit 51 and a terminal settings information registration unit 52 that store for each IP telephone the presence state of a user of the IP telephone. The presence state of a user set in, e.g., the IP telephone 60a is sent to the presence management information storage unit 51 and is registered and stored in each IP telephone. The settings information set in the IP telephone 60a and the like is sent to, registered, and stored in the terminal settings information registration unit 52.

The control means 64 organically controls the driving of the constituent elements of the IP telephone 60a and integrally controls communication processes that involve the IP network. The control means 64 is the core part that controls device components (e.g., display unit 61), computes data, processes data, and performs other tasks. Also, the control means 64 has an automatic modification function that automatically changes the presence state on the basis of the presence state of the user detected by the presence detection means 63.

In the case that the presence state showing that the user is, e.g., away, on break, or otherwise not present is set in advance in the IP telephone 60a via the automatic modification function of the control means 64, and the presence detection means 63 detects the call of the IP telephone 60a when the user makes a call using the IP telephone 60a. This state shows that the user is present, and the presence state is therefore automatically changed from "away" or "on break" to "present".

When the presence detection means 63 has detected that a call operation has not been made for a prescribed length of time set in advance, the control means 64 changes the presence state to a presence state that shows that the user is not present. The control means 64 can rewrite the contents of a presence table storage unit 651 in a later-described memory 65 by input from the operation input unit 62, and can enable or disable the automatic modification function described above.

The memory 65 is a medium for recording various data and has a plurality of storage units for each type of data to be stored. The memory 65 is configured so as to include at least the presence table storage unit 651 and the presence state storage unit 652.

The presence table storage unit 651 is a storage unit for storing the presence table as a list in which presence state display character strings and presence state notification character strings are associated. An example of a presence table is one in which [contents] are stored in the present table in advance; i.e., away, in a meeting, busy, on break, at lunch, business trip, on vacation, and other presence states are positioned in the left hand column, and display rows indicating that the automatic modification function of the control means 64 is enabled or disabled are positioned in the right hand column, as shown in TABLE 1 below.

Input for enabling or disabling the automatic modification function can be inputted from the operation input unit 62. In the present embodiment the automatic modification function is enabled by inputting "ON," and the automatic modification function is disabled by inputting "OFF." In other words, in the TABLE 1, the automatic modification function of the control means 64 is enabled for the presence states of "away," "in a meeting," "on break," and "at lunch," and the automatic modification function of the control means 64 is disabled for the presence states of "busy," "business trip," and "on vacation."

TABLE 1

| Presence state | Automatic modification function enabled or disabled |
|---|---|
| Away | ON |
| In a meeting | ON |
| Busy | OFF |
| On break | ON |
| At lunch | ON |
| Business trip | OFF |
| On vacation | OFF |

The presence state storage unit 652 is a storage unit for storing the presence state registered using the operation input unit 62 and the display unit 61. The presence state stored in the presence state storage unit 652 is notified to the presence server 50 via the IP network and is registered in the presence management information storage unit 51. The presence state storage unit 652 has a function for storing the presence state of the user of another IP telephone 60b or the like received from the presence server 50 via the IP network. Information is stored in the presence state storage unit 652 in relation to enabling the automatic modification function of the control means 64 when prescribed characters are inputted from the operation input unit 62 and disabling the automatic modification function of the control means 64 when other characters are inputted.

The operation input unit 62 is an input interface that the user uses to give various instructions to the IP telephone 60a when performing voice communications, data communications, and other communications via the IP telephone 60a. Specifically, the unit is composed of dial buttons, quick dial buttons, presence state registration buttons, and other buttons.

The display unit 61 is composed of a liquid crystal display unit or the like, and is an output interface for displaying to the user various information held in the IP telephone 60a. The unit is used to display the presence state and information when performing various settings.

The presence server 50 is a device of receiving, storing, managing, distributing, and carrying out other functions related to the presence state of each user notified by the IP telephone 60a. The presence server 50 relays the information pertaining to whether the user is present or out of the office, whereby the mutual state of users can be confirmed without keeping in contact with each other. It is possible to handle the presence state provided by a communication terminal (e.g., a PC, mobile phone, or the like) other than the IP telephone 60a or like via an IP network. The presence server 50 is configured so as to include at least the presence management information storage unit 51.

The presence management information storage unit 51 is a storage unit for, e.g., storing processing history or the like when a relay process has been performed, and settings information that is used for relaying to other communication terminals the presence state of each user that has been transmitted from a communication terminal (e.g., IP telephone 60a). The presence management information recorded in the presence management information storage unit 51 is updated each time a notification related to a presence state is received from a communication terminal.

The SIP server 40 is a communication controller that controls communication between the IP telephone 60a and other telephones by using SIP (Session Initiation Protocol). SIP is one type of communication control protocol provided with a transfer function, caller number notification function, and other functions, and has a characteristic in which the time required to make a connection is shorter than in the protocol of similar systems. The SIP server 40 is composed of a register server in which a client (e.g., IP telephone 60a) registers an address, a proxy server that searches addresses in place of the client, and a redirect server that transfers to another address a connection request that has been received from the client.

Next, the method of controlling a telephone according to embodiment 1 described above will be described with reference to the block diagram of FIG. 1 and the flowchart shown in FIG. 2.

Figure 2:
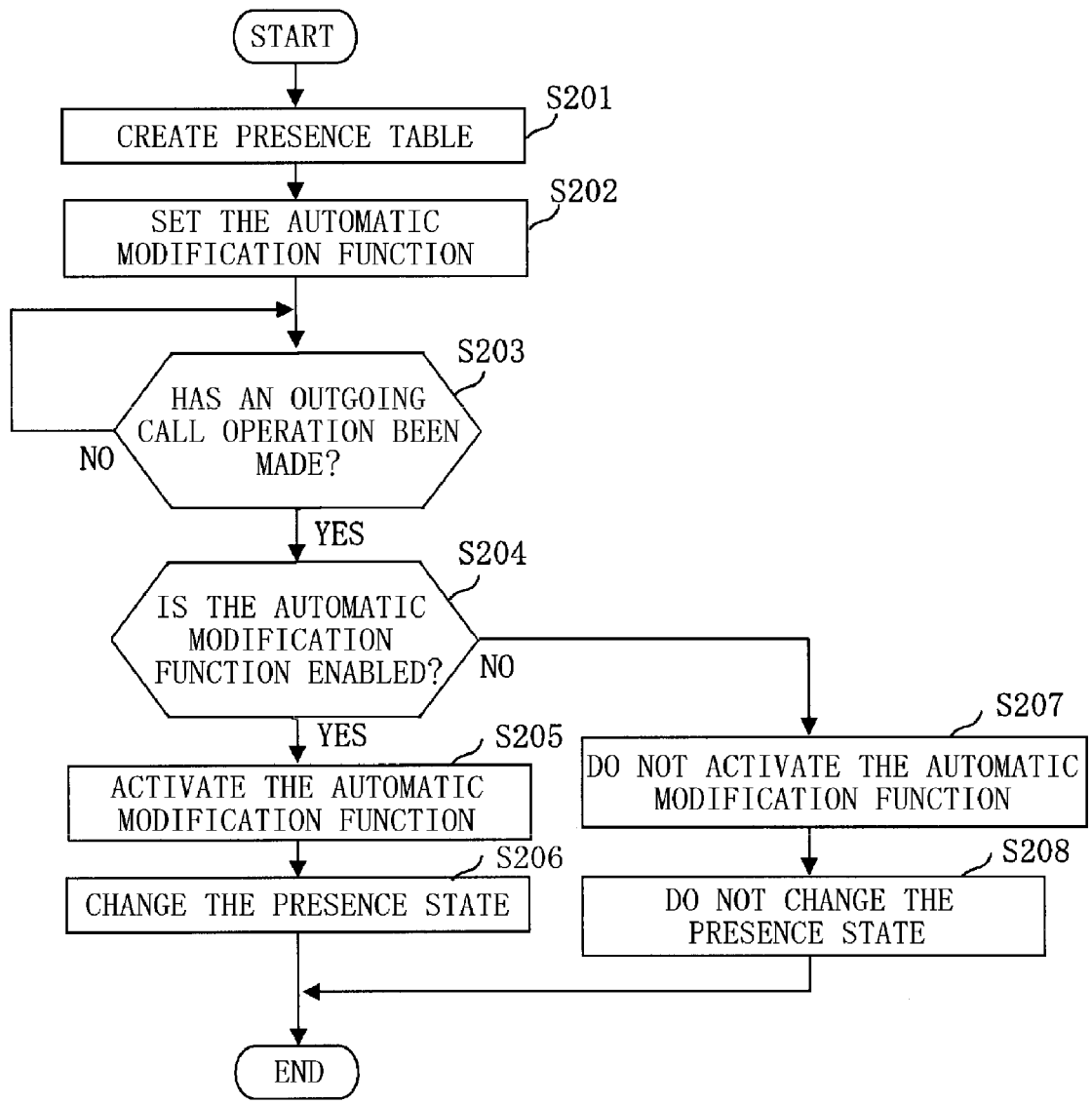
FIG. 2 is a flowchart showing the procedure of changing the presence state of a telephone according to embodiment 1 shown in FIG. 1.

The presence state for which the user desires to enable the automatic modification function of the control means 64 is inputted from the operation input unit 62, and a presence table is created and registered in the presence table storage unit 651 (step S201), as shown in FIG. 2. For example, the automatic modification function of the control means 64 is registered as enabled (ON) in the presence table for the presence states away, in a meeting, on break, and at lunch; and the automatic modification function of the control means 64 is registered as disabled (OFF) for the presence states busy, business trip, and on vacation, as shown in TABLE 1 above.

Next, the automatic modification function is set for prescribed presence states using the control means 64 on the basis of content registered by the user (step S202). The automatic modification function of the control means 64 is in an operable state for the presence states of away, in a meeting, on break, at lunch, for example; and the automatic modification function of the control means 64 is in an inoperable state for the presence states of busy, business trip, and on vacation.

Next, when the user inputs a prescribed telephone number using the operation input unit 62 to make an outgoing call, the presence detection means 63 detects an outgoing call of the IP telephone 60a and determines (determines the presence state) that the user is present (step S203). If an outgoing call is not detected, the process repeats the detection routine of step S203. When an outgoing call operation of the IP telephone 60a is determined, the control means 64 compares the presence state set by the user and the content stored in the presence table storage unit 651 and the automatic modification function is determined to be enabled or disabled (step S204).

When it is determined that the automatic modification function is enabled for a presence state set by the user, the automatic modification function of the control means 64 is thereby activated (step S205). On the other hand, when it is determined that the automatic modification function is disabled for a presence state set by the user, the automatic modification function of the control means 64 is not activated (step S207). For example, the automatic modification function of the control means 64 is activated when the presence state is set to "away" by the user, and the automatic modification function of the control means 64 is not activated when the presence state is set to "on vacation" by the user.

Next, when the automatic modification function of the control means 64 is activated, the presence state set by the user is changed (step S206), and if the automatic modification function of the control means 64 is not activated, the presence state set by the used is not changed (step S208). For examples since the presence detection means 63 has detected an outgoing call in the routine of step S203 and detected that the presence state is "present," the presence state is changed from "away" to "present" when the automatic modification function of the control means 64 is activated, and if the automatic modification function of the control means 64 is not activated, the presence state remains "away" as set by the user.

As described above, since the control means 64 is provided with an automatic modification function, the presence state of the user is automatically changed by the control means 64 when an outgoing call operation has been made using the IP telephone 60a. For example, in the case that the presence state of the IP telephone 60a is changed to set to "away," the labor of changing the presence state can therefore be reduced for the user because the presence state is automatically set to "present" by the control means 64 when the user of the IP telephone 60a performs an outgoing call operation. Also, the presence state is automatically changed to "present" by the control means 64, whereby the presence state set in the IP telephone 60a can be prevented from not conforming to the actual state of the user.

Also, when the user inputs prescribed characters using the operation input unit 62 to thereby enable the above-described automatic modification function of the control means 64, the labor of changing the presence state can be reduced for the user because the presence state is automatically changed by the control means 64, and the presence state set in the IP telephone 60a can be prevented from not conforming to the actual state of the user. On the other hand, when the user inputs other characters using the operation input unit 62 to disable the automatic modification function of the control means 64, the presence state of the user is not automatically changed by the control means 64 even when an outgoing call operation is performed using the IP telephone 60a.

For example, the presence state set in the IP telephone 60a can be prevented from not conforming to the actual state of the user even when a third person borrows the IP telephone 60a of the normal user because the presence state of the normal used is not automatically changed to "present" by the control means 64 when a third person other than the normal user of the IP telephone 60a temporarily borrows the IP telephone 60a of the user.

In particular, information related to the enabling or disabling the automatic modification function of the control means 64 is stored in the presence table storage unit 651 for each of the plurality of presence states, and the automatic modification function of the control means 64 is activated based on the information stored in the presence table storage unit 651, whereby the presence state for which the user of the IP telephone 60a desires to enable the automatic modification function and the presence state for which the user desires to disable the automatic modification function can be differentiated in advance. As a result, the presence state set in the IP telephone 60a can be prevented from not conforming to the actual state of the user.

For example, if information such as that shown in TABLE 1 above is stored in the presence table storage unit 651, the labor of changing the presence state is eliminated for the user because an outgoing call operation is performed using the IP telephone 60a to thereby automatically change the presence state changed to "present" in the case that the user has set [the presence state] to "away" or "on break," and the presence state set in the IP telephone 60a can be prevented from not conforming to the actual state of the user. On the other hand, the presence state set in the IP telephone 60*a* can be prevented from not conforming to the actual state of the user in the case that the user has set [the presence state] to "on vacation" or "business trip" because the presence state is not automatically changed to "present" even when a third person borrows the IP telephone 60*a* of the user and performs an outgoing call operation.

In the manner described above, when the presence detection means 63 detects an outgoing call of the IP telephone 60*a* and the presence state stored in the presence state storage unit 652 is automatically changed to "present," the changed presence information is sent to the presence server 50, and the changed content is registered in the presence management information storage unit 51. The fact that the presence state of the user of the IP telephone 60*a* has changed to "present" can thereby be known from another IP telephone 60*b* or the like. The configuration can be one in which the presence detection means 63 detects that an outgoing call operation of the IP telephone 60*a* has not been carried out for a prescribed interval, and the presence state is changed to a presence state indicating "not present" when the user of the IP telephone 60*a* has thereafter returned home, is out of the office, or is otherwise away from this desk. As used herein, the term "not present" includes "away," "on break," and various states in which the user is not present.

When the configuration is one in which an outgoing call operation of the IP telephone 60*a* has not been performed for a prescribed interval as described above, and the presence state is changed to a presence state showing "not present," it is possible to consider that the presence state would be changed to "not present" when the user is away during lunch in the case that the prescribed interval has been set to about 1 hour. In such a case, the setting of the prescribed interval can be disabled during a time interval such as during the lunch hour.

Figure 3:
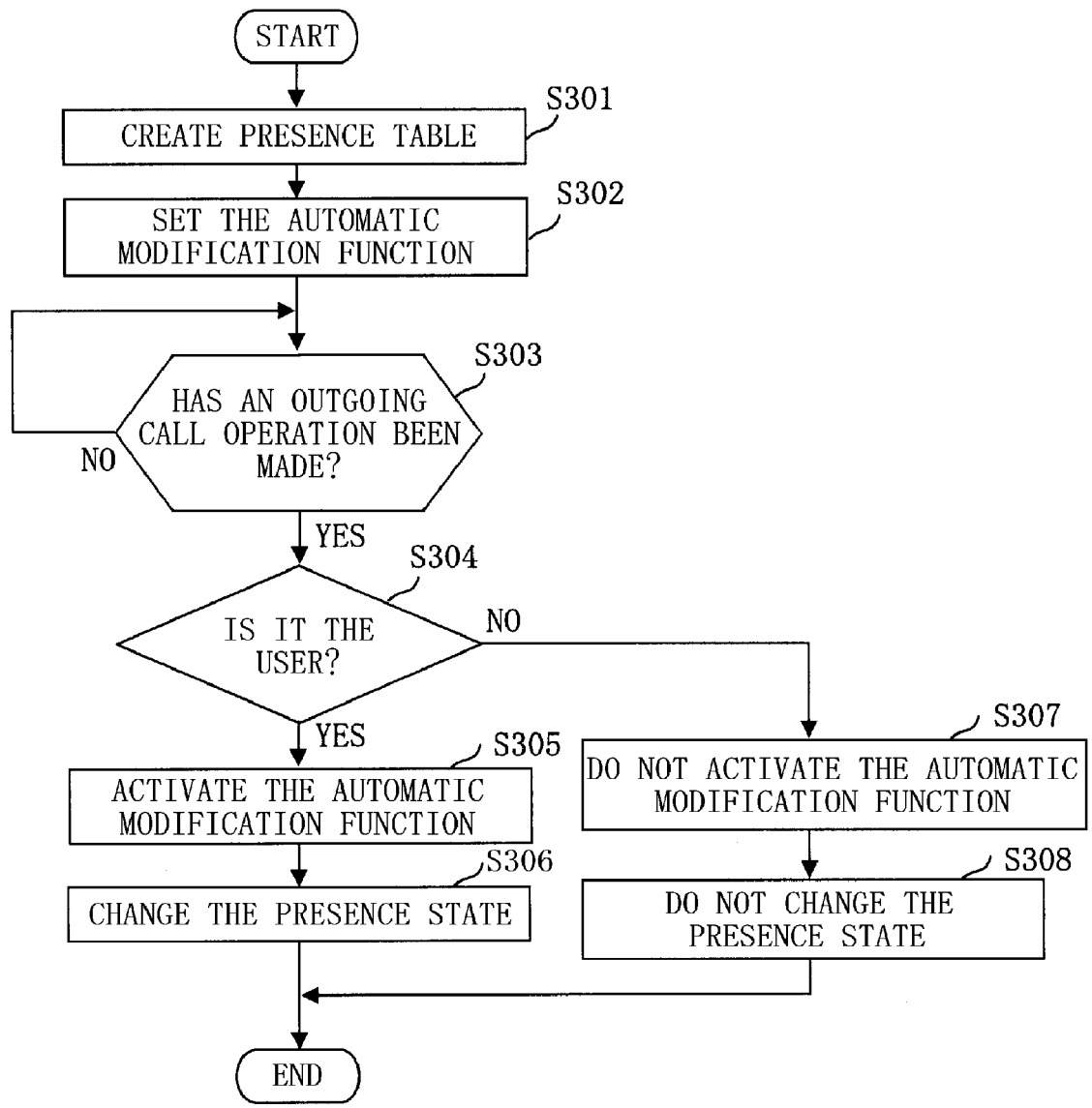
FIG. 3 is a flowchart showing a changed example of the procedure of changing the presence state of a telephone according to embodiment 1 shown in FIG. 1.

In the operation procedure of the flowchart of FIG. 2, the configuration is one in which the control means 64 detects an outgoing call and automatically changes the presence state in accordance with the enabled or disabled setting of the automatic modification function registered by the user of the IP telephone 60*a* in the presence table storage unit 651, but the user of the IP telephone 60*a* may be authenticated and the authentication procedure may be varied. Specifically, the configuration may be one in which the presence state is automatically changed after having used the user ID, password, or another user authentication routine procedure registered in the IP telephone system to authenticate the IP telephone 60*a* and the relationship thereof to the user. FIG. 3 is a flowchart showing such an operation procedure. In accordance with this procedure, the presence state can be prevented from being automatically changed when a third person has temporarily borrowed the IP telephone 60*a* of another user to make an outgoing call.

For example, in step S304, the control means 64 determines whether [the person using the telephone] is the user of the IP telephone 60*a*. If [the person using the telephone] is determined to be the user, the process advances to step S305, as shown in FIG. 3, and if [the person using the telephone] is determined not to be the user, the process advances to step S307. The routines of steps S301 to S303 are the same routines as those of steps S201 to S203 in FIG. 2. The routines of steps S305 to S308 are the same routines as those of steps S205 to S208 in FIG. 2.

In this case, the determination performed by the control means 64 as to whether [the person using the telephone] is the user can be carried out by providing the control means 64 with a voice recognition function (not shown) that recognizes the name of the user, and when the user using the IP telephone 60*a* begins a conversation with a counterpart, the name of the user spoken by the user (outgoing caller) or the counterpart (incoming call receiver) is detected by the voice recognition function of the control means 64, whereby it can be determined whether [the person using the telephone] is the user. It is also possible to determine whether the [the person using the telephone] is the user by using a voice print rather than the name. The telephone number of a prescribed counterpart may be stored in advance in the memory 65, and the telephone number may be inputted using the IP telephone 60*a*, whereby the control means 64 determines that the [the person using the telephone] is the user. Alternatively, a user authentication procedure that uses a user ID, password, or the like that is registered in the IP telephone system may be used to authenticate the IP telephone 60*a* and the user thereof to make the determination.

In the description above, the presence state is automatically changed when the user is the caller, but it is also possible to determine that [the person using the telephone] is the user when the user is the call receiver and to automatically change the presence state. When the user is the call receiver, [the person using the telephone] can be determined to be the user by using the voice print of the call receiver. Also, the caller number can be used to determine that [the person using the telephone] is the user.

In the example described above, an outgoing call operation can be detected by the presence detection means 63 in the IP telephone 60*a*, but it is also possible to apply various methods described below to detect the presence state of a user in the presence detection means 63.

The first method is a method for carrying out control in which voices around the IP telephone 60*a* are detected by presence detection means 63, and the presence state is changed to "present" when the voice of the user is recognized within a fixed interval using a voice recognition sensor that makes a comparison with the users voice print to authenticate the user, and the presence state is changed to "not present" when the voice of the user is not recognized within a fixed interval.

The second method is a method for carrying out control in which a connectable mobile phone charger is connected to the IP telephone 60*a* via a USB port, and the presence detection means 63 is configured to detect the presence state by detecting whether the mobile phone owned by the user is set or not set on the charger. In the presence detection means 63, the presence state is changed to "present" when the mobile phone is detected to have been set on the charger, and the presence state is set to "not present" when the mobile phone is detected to not be set on the charged.

Embodiment 2 of the Invention

Figure 4:
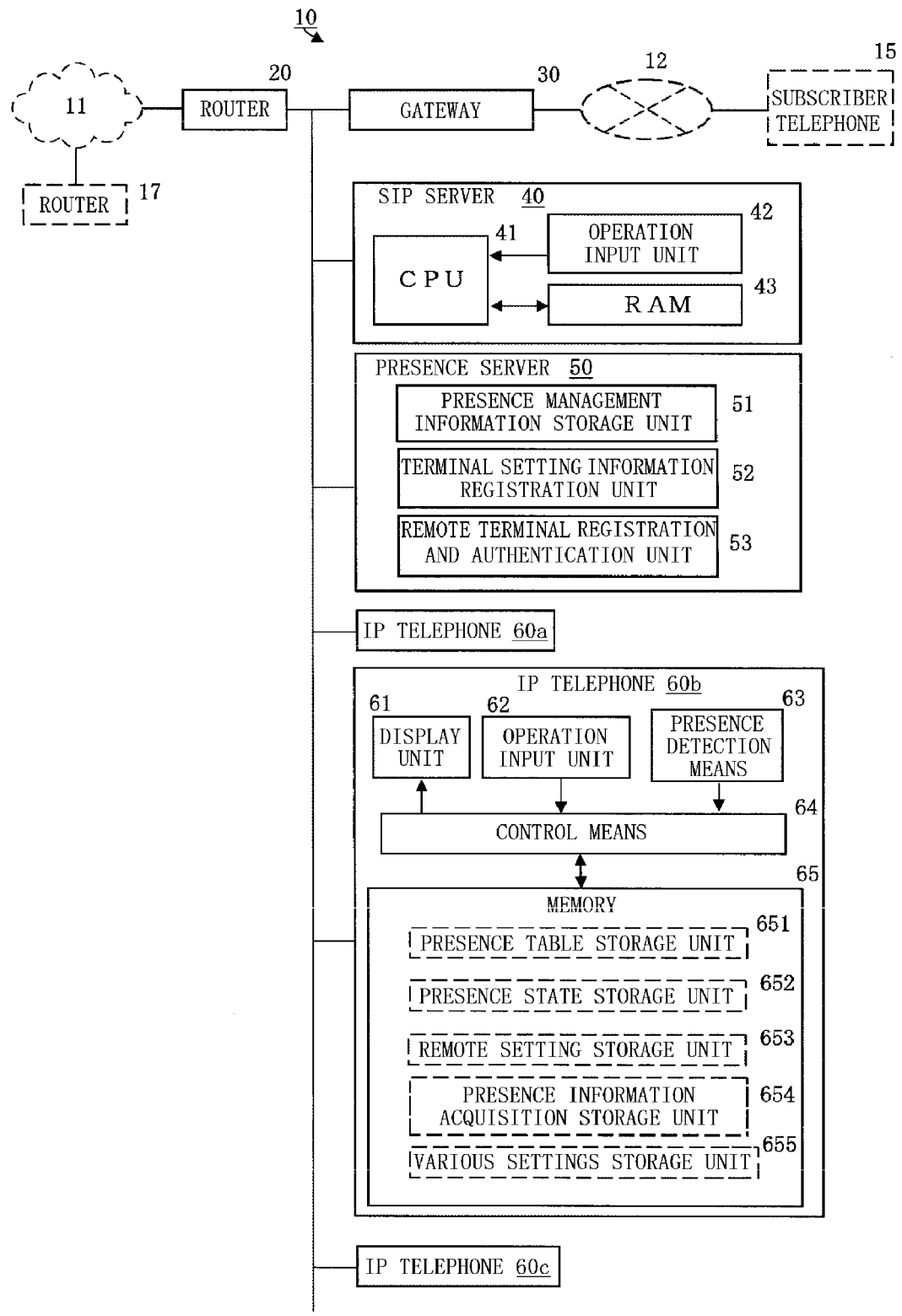
FIG. 4 is a block diagram showing the configuration of a telephone according to embodiment 2 of the present invention.

FIG. 4 is a block diagram showing the configuration of the telephone according to embodiment 2 of the present invention. In the telephone according to embodiment 1 shown in FIG. 1, the configuration is one in which the presence state automatically set in the telephone is changed by detecting the presence state of the user. In embodiment 2 shown in FIG. 4, the telephone is configured so that the presence state of the user of a certain telephone can be set and changed by presence information sent from another telephone that has been remotely set and registered. In the IP telephone shown in FIG. 4, the same reference numerals are used for the same constituent elements as in the IP telephone shown in FIG. 1

In FIG. 4*r* the telephone is composed of so-called IP telephones 60*a*, 60*b*, and 60*c* in the same manner as in FIG. 1, and the IP telephones 60a to 60c comprise control means 64, memory 65, an operation input unit 62 composed of a group of operation buttons, a display unit 61 composed of a liquid crystal display panel or the like, and presence detection means 63 for detecting the presence state of a user. The IP telephone 60a and the like are provided with a remote setting storage unit 653 and a presence information acquisition storage unit 654, as shown in FIG. 4. The presence server 50 is provided with a remote terminal registration and authentication processing unit 53. Other than the remote setting storage unit 653, the presence information acquisition storage unit 654, and the remote terminal registration and authentication unit 53 (see presence server 50), the constituent elements have the same functions as the IP telephones and presence server shown in FIG. 1, and a description thereof is omitted.

The IP telephones 60a to 60c according to embodiment 2 are connected via an IP network to a presence server 50, an SIP server 40 as a call connection control server, a gateway 30, and a router 20. A call between a subscriber telephone 15 connected to a telephone circuit network 12, and the IP telephone 60a and the like is connected via the gateway 30 on the basis of call connection control of the SIP server 40 inside the IP network. Also, a call between a telephone of another IP telephone system connected to the router 17, [and the IP telephone 60a] is connected via the Internet network 11 and the router 20 on the basis of call connection control of the SIP server 40.

In the present embodiment 2, the presence state of a user of another IP telephone can be changed from a certain IP telephone. In the description below, the function and operation of each component will be described using a specific example in which the company president uses IP telephone 60a, the secretary uses IP telephone 60b, and the secretary uses the IP telephone 60b to change the presence state of the president in the IP telephone 60a of the president. As described in embodiment 1, a presence state storage unit 652 is disposed in the IP telephone 60a. The presence state storage unit 652 stores presence information that shows the presence state inputted by the user, or stores presence information that is based on the presence state detected by the presence detection means 63. The presence information stored in the presence state storage unit 652 must match the presence information that is registered in the presence server 50.

For this reason, when the IP telephone 60a is powered on and started (when the fact that the selfsame telephone has connected to the network is notified to and registered in the SIP server 40 or the like), the presence state of the selfsame terminal (in this case, IP telephone 60a) registered in the presence management information storage unit 51 is acquired from the presence server 50. A comparison is made with the presence information stored in the presence state storage unit 652, and when the two do not match, [the present invention] is updated to the presence information registered in the presence server 50. When the updated presence information is changed, new presence information is inputted from the operation input unit 62, and the presence information registered in the presence server 50 is changed.

FIG. 5 is a diagram showing an example of a configuration of presence information registered in the presence management information storage unit 51. For each VoIP 1 (IP telephone 60a or the like) as a terminal, the presence state of the IP telephone 60a and the like is composed of a terminal ID, a registration password PW, a presence (present or not present), reason for non-presence, non-presence time period, incoming call transfer destination during non-presence, and other information, as shown in FIG. 5. The presence state of the user (users) of each IP telephone 60a and the like can be inputted from the selfsame terminal and registered. The registration password PW is sent to the presence server 50 together with the terminal ID and is used for authenticating the user of each terminal.

Figure 6:
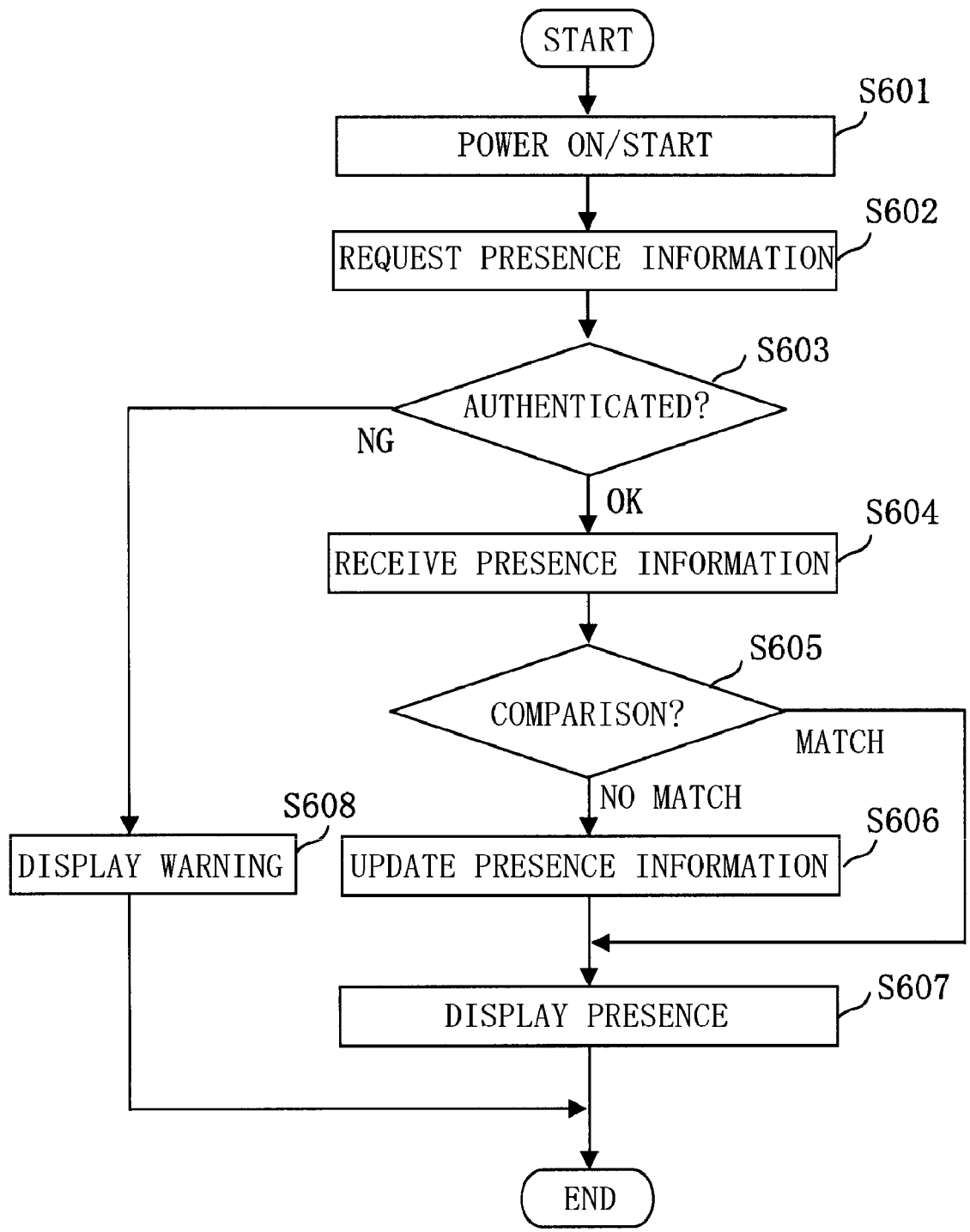
FIG. 6 is a flowchart showing the operation procedure when an IP telephone is started up (connected to a network)

FIG. 6 is a flowchart showing the operation procedure when the IP telephone 60a or the like, e.g., IP telephone 60b, is started up (connected to a network). When the power of the IP telephone 60b is switched on (connected to the network) in step S601, the IP telephone 60b transmits a presence information request to the presence server 50 (step S602). When a presence information request is made, the presence server 50 checks the terminal ID and password of the IP telephone 60b in the routine of step S603 to perform authentication. When authentication has been made, the presence information is transmitted from the presence server 50, and the IP telephone 60b receives the presence information of the selfsame terminal from the presence server 50 in the routine of step S604. If authentication is not made in the routine of step S603, a warning is displayed in the routine of step S608, and the process is ended.

When presence information is received from the presence server 50 in the routine of step S604, a comparison is made in step S605 with the presence information stored in the presence state storage unit 652 of the selfsame terminal. If the two match as a result of the comparison, the process advances to the routine of step S607, the presence information is displayed on the display unit 61, and the process is ended.

If the two do not match in the comparison routine of step S605, the process advances to the routine of step S606, the presence information received from the presence server 50 is stored and updated in the presence state storage unit 652, the presence information is displayed on the display unit 61 in the routine of step S607, and the process is ended.

Next, the processing procedure in which the user of IP telephone 60b registers and updates a presence state from the selfsame terminal will be described based on the flowchart of FIG. 7. In the routine of S711, the user inputs a password, and the presence information is then updated and inputted in the routine of step S712. In the routine of step S713, a presence update registration request is transmitted from the IP telephone 60b to the presence server 50. The password inputted by the user and the updated and inputted presence state are added to the presence update registration request.

When the presence server 50 receives a presence update registration request, authentication is performed by using the terminal ID and password in the routine of step S721. In the case that authentication cannot be made, a warning is transmitted to the IP telephone 60b in the routine of step S724, and the process is ended. If authentication is made in the authentication routine of step S721, the presence information registered in the presence management information storage unit 51 is updated and registered in the routine of step S722 to the updated and inputted presence information. When the updating and registration is completed, the presence server 50 notifies the IP telephone 60b of the presence information update completion in the routine of step S723, and the process is ended.

When the IP telephone 60b has received notification of the update completion in the routine of step S714, the presence information of the presence state storage unit 652 of the selfsame terminal is updated, the presence information is displayed to the display unit 61 in the routine of step S716, and the process is ended.

The IP telephone 60b can be provided with a function for remotely updating the presence state of another IP telephone, e.g., the IP telephone 60a, as described above. Specifically, a remote button (not shown) is provided to the operation input unit 62 of the IP telephone 60b, the remote button is operated to perform remote setting, and another IP telephone, which in this case is the IP telephone 60a as the target of changing the presence state, is registered in the presence server with the aid of the remote function. The remote button of the operation input unit 62 is thereafter operated to thereby allow the presence information of the other IP telephone 60a (the president's terminal) to be remotely updated.

The IP telephone 60b transmits remote setting information to the presence server 50 when remote setting is performed via the remote button. The remote setting information is registered in the remote terminal registration and authentication unit 53, and is used for authentication when a remote update process is thereafter carried out from the IP telephone 60b. The IP telephone 60b is provided with a remote setting storage unit 653 and a presence information acquisition storage unit 654.

The terminal ID and registered password (PW) of the IP telephone 60b, which is the selfsame terminal; the terminal ID of the IP telephone 60a as the target of remotely updating the presence state that has been set and inputted from the operation input unit 62 during remote setting; and the registration password (PW: the password registered by the user of the IP telephone 60a) registered to the terminal ID are stored in the remote setting storage unit 653 as setting information. The setting information is transmitted to the presence server 50 and registered in the remote terminal registration and authentication unit 53.

The relationship between the IP telephone for which the remote function has been set and the IP telephone as the target in which the IP telephone will remotely update the presence state are registered in the remote terminal registration and authentication unit 53 in order to perform authentication in the presence server 50. In the case of embodiment 2, this relationship is the relationship between the IP telephone 60b and the IP telephone 60a. FIG. 8 is a diagram showing an example of the configuration of remote setting information registered in the remote terminal registration and authentication unit 53. Remote "ON" flag information is stored in the IP telephone 60b for which remote setting has been performed, and a record is made of the passwords of the users registered in the IP telephone as the target of remote updating (in this case, the IP telephone 60a of the president) and in the IP telephone 60a, as shown in FIG. 8. Therefore, the presence server 50 can perform an authentication process on the basis of the terminal ID and passwords recorded in the remote terminal registration and authentication unit 53 when an operation for updating the presence information of the IP telephone 60a has been performed from the IP telephone 60b.

The presence information acquisition storage unit 654 of the IP telephone 60b is a storage unit for acquiring the presence information of the IP telephone 60a from the presence server 50 and temporarily storing the information when the presence information of another IP telephone 60a in which the remote button has been operated and set to remote is updated.

When the secretary remotely updates the presence information of the IP telephone 60a of the president from his own IP telephone 60b, the remote setting process is carried out in the manner described above, the terminal ID and password of the IP telephone 60a are set in the remote setting storage unit 653, and the remote update function is enabled. When the presence information of the IP telephone 60a is updated based on schedule management of the president, the secretary performs a remote update from his own IP telephone 60b. In this case, the presence button is operated, and the presence information of the IP telephone 60a is first acquired from the presence server 50 temporarily stored in the presence information acquisition storage unit 654. Next, the update information is inputted from the operation input unit 62, and the presence information of the IP telephone 60a is registered in the presence management information storage unit 51 of the presence server 50 is updated. The IP telephone 60b functions in the same manner as an ordinary IP telephone when the remote button has not been operated.

The IP telephone 60b may be configured to access the webpage of the presence server 50, display the presence information of the IP telephone 60a, and update and input [the presence information] when the presence information of the IP telephone 60a is updated. In such a case, the authentication of the IP telephone 60b can be carried out using the same method as that described above, and remote updating can be performed from an IP telephone (in this case, the IP telephone 60b that has performed remote setting) that has been authorized to make changes.

When the IP telephone 60b has performed a remote setting and performed a remote terminal registration in the presence server 50, the notification of the changed presence information is received from the presence server 50 each time the presence information registered in the presence server 50 is changed by an automatic update of the presence state of embodiment 1 from another IP telephone 60a registered in the remote terminal registration and authentication unit 53. The IP telephone 60b can thereby ascertain the updated presence information even when the presence information registered in the presence server 50 is updated by the IP telephone 60a, which is the remote target.

Furthermore, the presence information registered in the presence server 50 is acquired from the other IP telephone 60a set in the remote terminal registration and authentication unit 53 when the IP telephone 60b is powered on and registered as connected to the network. The IP telephone 60b can thereby constantly ascertain the most recent presence information registered in the presence server 50.

FIG. 9 is a flowchart showing the procedure for remotely updating the presence state of the IP telephone 60a from the IP telephone 60b. First, when the presence information of the IP telephone 60a is to be remotely updated from the IP telephone 60b, the remote button (not shown) of the operation input unit 62 is operated to set remote setting to "ON" in the routine of step S911, the terminal ID and password of the IP telephone 60a as the target of the remote function are set in the remote setting storage unit 653 in the routine of step S912, and the remote update function is enabled. The processing up to this point may be carried out a single time and is not required to be carried out each time remote updating is performed.

Next, the terminal ID and password of the IP telephone 60a registered in the remote setting storage unit 653 is transmitted to the presence server 50 when the remote button is operated in the routine of step S913. The presence server 50 subsequently makes a comparison with the terminal ID password of the IP telephone 60a registered in the remote terminal registration and authentication unit 53 in the routine of step S921, and performs an authentication process. If authentication cannot be made, the presence server 50 transmits warning information to the IP telephone 60b, and the process is ended.

If authentication is made in the routine of step S921, the presence server 50 transmits (step S922) the presence information (the presence state of the IP telephone 60a registered in the presence management information storage unit 51) of the IP telephone 60a to the IP telephone 60b. The IP telephone 60b acquires the presence information of the IP telephone 60a transmitted from the presence server 50 in the routine of step S914, and temporarily stores [the information] in the presence information acquisition storage unit 654. When the update inputting of the presence information is carried out in the routine of step S915, the content of the presence information acquisition storage unit 654 is changed and a presence update registration request of the IP telephone 60*a* is transmitted to the presence server 50 in the routine of step S916.

The presence server 50 updates and registers the presence information of the IP telephone 60*a* in the routine of step S923. Specifically, the presence information of the IF telephone 60*a* of the presence management information storage unit 51 is updated based on the changed content of the presence information acquisition storage unit 654 transmitted via the presence update registration request from the IP telephone 60*b*. The completion of the updating and registration of the presence information is notified to the IP telephone 60*b* in the routine of step S924, and the process is ended. The IP telephone 60*b* receives notification indicating that the presence information of the IP telephone 60*a* has been updated in the routine of step S917, and the process is ended.

In this manner, the presence information of the IP telephone 60*a* can be remotely updated from the IP telephone 60*b*. When the IP telephone 60*a* is started up, the presence information of the IP telephone 60*a* that has been remotely updated in this manner is reflected in the IP telephone 60*a* from the presence server 50 using the procedure described in the flowchart of FIG. 3, the presence state storage unit 652 of the IP telephone 60*a* is also updated with the presence information registered in the presence server 50, and the updated presence information is displayed on the display unit 61.

Figure 7:
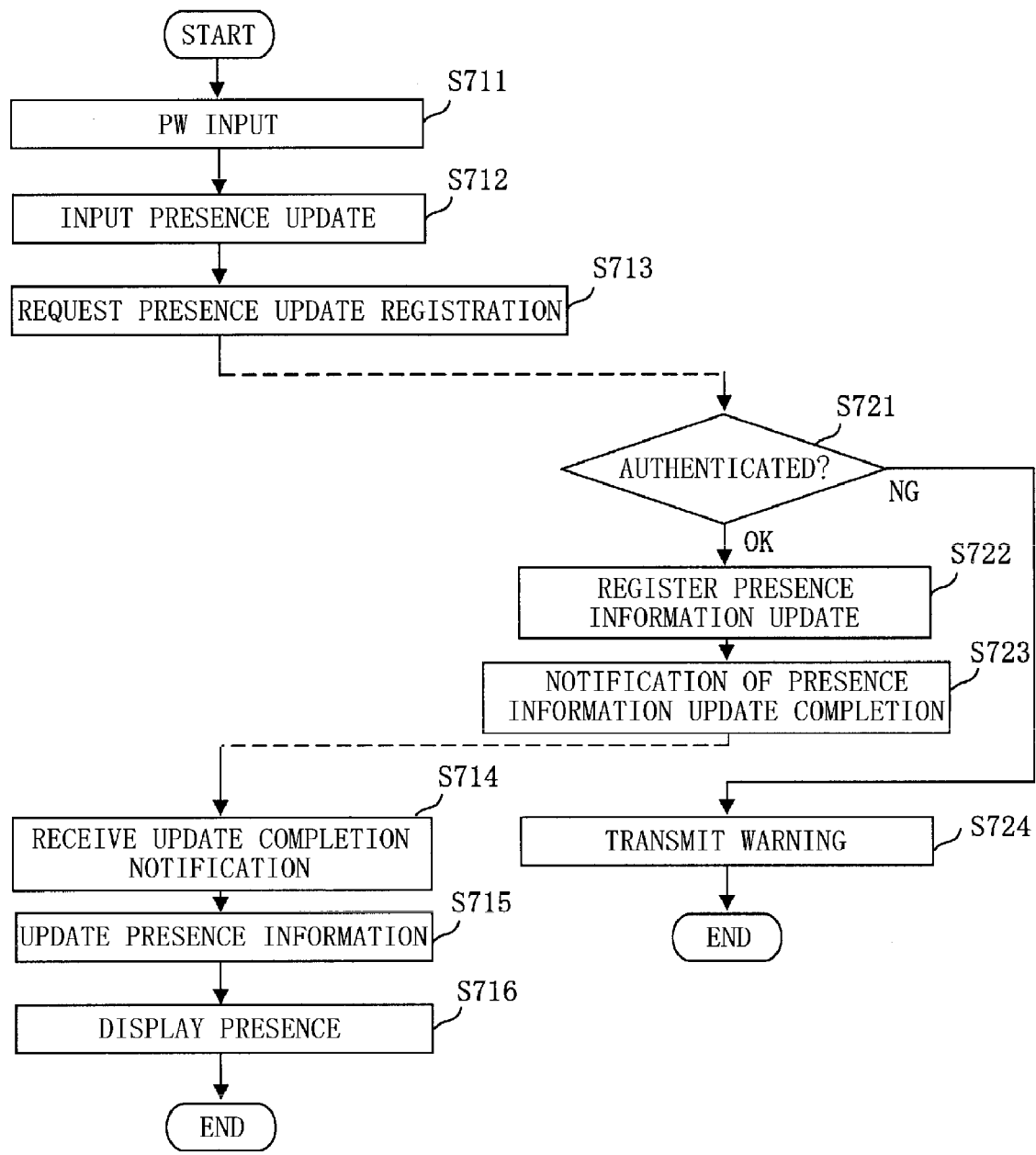
FIG. 7 is a flowchart showing the operation procedure when presence state is changed by an input operation.

The communication between the IP telephones 60*a* and 60*b* and the presence server 50 can be carried out using various SIP commands in SIP protocol in the processing procedures of the flowchart shown in FIGS. 7 and 9. Here, a detailed description of the SIP commands is omitted.

In the IP telephone system described above, an example was described in which an authentication process is carried out in the presence server 50 when remote updating is performed, but the registration of the authentication information in the IP telephone 60*b* can be used as authentication, and the authentication process in the presence server 50 can be omitted. Alternatively, the authentication function may be achieved by registering, in the remote terminal registration and authentication unit 53, the IP telephone 60*b* in which the remote function has been set and the IP telephone 60*a*, which is the target of remote changing.

The remotely updated presence information is configured to be updated by verifying the presence state registered in the presence server 50 against the presence state stored in the IP telephone 60*a* when the IP telephone 60*a* as the target of remote updating is started up. However, the IP telephone 60*a* may be configured to acquire the presence information from the presence server 50 at prescribed cycles and to progressively make updates when there is a difference between the two. Alternatively, a configuration is also possible in which presence information that is to be updated is transmitted from the remotely updated IP telephone 60*b* to the presence server 50, whereupon the presence information is also transmitted to the IP telephone 60*a* as the target of remote updating. This is detected by the presence detection means 63 of the IP telephone 60*a*, and the presence information stored in the presence state storage unit 652 of the IP telephone 60*a* is updated.

Furthermore, the configuration may be one in which the presence information of the selfsame IP telephone 60*a* is acquired from the presence server 50 when the presence information is registered and processed in the presence server 50 from the selfsame IP telephone 60*a* in the procedure of FIG. 7. When the presence information is updated from the selfsame IP telephone 60*a*, the presence information acquired from the presence server 50 can be ignored because the two are the same. When the presence information is updated from another IP telephone 60*b* set for remote, there is a possibility that the two may not match. If the two do not match, the content of the presence state storage unit 652 of the selfsame IP telephone 60*a* may be updated with the presence information acquired from the presence server 50.

Next, other setting information and the processing thereof in the IP telephone 60*a* and the like according to embodiments 1 and 2 of FIGS. 1 and 4 will be described. In the description below, the various setting information of the telephone will be described for the IP telephone 60*a* (see FIG. 1).

The telephone is generally connected to a plurality of telephone lines, the telephone numbers corresponding to each of the telephone lines are assigned, and incoming calls to the telephone numbers can be connected to the telephone to carry out conversations. This situation is same in IP telephones as well. Examples of the plurality of telephone lines include telephone lines for administration telephones, group telephone lines that are used when a plurality of telephones share a shared group telephone number, telephone lines for personal telephone numbers assigned to users of the telephone, and extension telephone lines. In other words, when a telephone is connected to the plurality of telephone lines, connections are made to the telephone and conversations can be carried out even when there is an incoming call to an administration telephone number, a group telephone number, a personal telephone number, or an extension number.

Naturally, when the telephone is connected to only a single telephone line, essentially only incoming calls of the telephone number of this telephone line can be connected. In this case, incoming calls to other telephone numbers can be transferred and connected to any telephone with the aid of an extension by establishing transfers to a private branch exchange or an SIP server.

In a telephone connected to a plurality of telephone lines, priority is set in the case of simultaneous incoming calls to the telephone lines, and the incoming calls to telephone lines having high priority can be connected to the telephone with priority. Generally known are techniques (e.g., see Japanese Laid-open Patent Application Nos. 7-264297 and 2002-171335) in which incoming calls of callers having the higher priority are answered in accordance with the caller information acquired using the caller identification information and the order of priority information in which the order of priority of each caller is registered in advance, techniques (e.g., see Japanese Laid-open Patent Application No. 7-123138) in which the order of priority is set in relation to incoming calls among outside lines or in relation to incoming calls of outside and inside lines, and other techniques.

However, with the above techniques, the needs of the user cannot necessarily be satisfied in a telephone having a plurality of telephone circuits (lines, telephone numbers) that differ in quality. Specifically, it is convenient to be able to respond to incoming calls with a focus placed on the incoming call line (incoming call telephone number) rather than the telephone number of the caller, such as when the priority preference is answering incoming calls from outside lines over inside lines, or priority preference is answering incoming calls from personal lines over shared group lines that are shared among a group.

In order to make such settings possible, the IP telephone 60*a* can perform settings such as those described below in the various settings storage unit 655 with the aid of the operation input unit 62. Specifically, a total of four telephone lines are set in the IP telephone 60a, and four telephone numbers are established that correspond to the telephone lines. Specifically, a first telephone number and a second telephone number are each established for communication with outside telephones (outside telephones including IP telephones) using the first and second telephone lines, and a third telephone number and a fourth telephone number are each established for communication with inside group telephones (inside telephones including IP telephones) using the third and fourth telephone lines. The telephone lines set in the IP telephone 10 are not particularly limited to four lines, and two or more lines, i.e., a plurality of lines may be used.

When incoming calls arrive through two or more telephone lines among the plurality of telephone lines, information related to which telephone line is given priority and selected is stored as settings data in the various settings storage unit 655. Specifically, data that indicates the order of priority related to incoming calls is set so that when an incoming call has arrived through a telephone line of another telephone number (second telephone number, third telephone number, fourth telephone number) while there is an incoming call on the telephone line of the first telephone number, the telephone line of the first telephone number is selected with higher priority; the telephone line of the second telephone number is selected with higher priority when an incoming call has arrived through a telephone line of another telephone number (third telephone number, fourth telephone number) while there is an incoming call on the telephone line of the second telephone number; the telephone line of the third telephone number is selected with higher priority when an incoming call has arrived through a telephone line of another telephone number (fourth telephone number) while there is an incoming call on the telephone line of the third telephone number. Ring tones (melodies) that correspond to the telephone lines of the IP telephone 60a are stored as data in the various settings storage unit 655.

The control means 64 selects with priority prescribed telephone lines on the basis of data stored in the various settings storage unit 655. When a prescribed telephone line is selected with priority by the control means 64, the display unit 61 is controlled by the control means 64, and the telephone number of the counterpart calling on the telephone line and other information related to the counterpart are displayed on the display unit 61. Also, the ring tone that corresponds to the prescribed telephone line that has been selected with priority by the control means 64 is played.

FIG. 10 is a flowchart showing a procedure for controlling incoming calls in accordance with the incoming call priority order set in the various settings storage unit 655. When incoming calls occur substantially simultaneously on a plurality of telephone lines of a IP telephone 60a (step S100), the control means 64 selects with priority a prescribed telephone line on the basis of data stored in the various settings storage unit 655, as shown in FIG. 10. Specifically, the control means 64 determines whether the telephone number of the telephone line of an incoming call is the first telephone number (step S101). As a result, when the control means 64 has determined that [the telephone number] is the first telephone number, the telephone line of the first telephone number is selected with priority (step S102) even when there are other telephone lines having incoming calls (the telephone line of the second telephone number, the telephone line of the third telephone number, the telephone line of the fourth telephone number). The telephone number of the counterpart who made the call to the telephone line of the first telephone number is thereby displayed on the display unit 61 and the ring tone that corresponds to the telephone line of the first telephone number is played.

Next, when the control means 64 determines that the telephone number of the telephone line that has an incoming call is not a first telephone number, the control means 64 determines whether the telephone number of the telephone line having an incoming call is a second telephone number (step S103). As a result, when the control means 64 has determined that the telephone number of the telephone line having an incoming call is the second telephone number, the telephone line of the second telephone number is selected with priority (step S104) even when there is another telephone line having an incoming call (the telephone line of the third telephone number, the telephone line of the fourth telephone number). The telephone number of the counterpart who made the call to the telephone line of the second telephone number is thereby displayed on the display unit 61, and the ring tone that corresponds to the telephone line of the second telephone number is played.

Next, when the control means 64 determines that the telephone number of the telephone line that has an incoming call is not a first or second telephone number, the control means 64 determines whether the telephone number of the telephone line having an incoming call is a third telephone number (step S105). As a result, when the control means 64 has determined that the telephone number of the telephone line having an incoming call is the third telephone number, the telephone line of the third telephone number is selected with priority (step S106) even when there is another telephone line having an incoming call (the telephone line of the fourth telephone number). The telephone number of the counterpart who made the call to the telephone line of the third telephone number is thereby displayed on the display unit 61, and the ring tone that corresponds to the telephone line of the third telephone number is played.

When the control means 64 determines that the telephone number of the telephone line that has an incoming call is not a third telephone number either, the telephone line of the fourth telephone number is selected (step S107), the telephone number of the counterpart who made the call to the telephone line of the fourth telephone number is thereby displayed on the display unit 61, and the ring tone that corresponds to the telephone line of the fourth telephone number is played.

Incoming calls having a different order of priority as described above can also be set in the various settings storage unit 655 of the IP telephone 60a. For example, the order of priority set in the various settings storage unit 655 is set so that the telephone line that corresponds to a prescribed telephone number has first priority, the telephone line that corresponds to a telephone number that arrives from an outside line has second priority, and the telephone line that corresponds to a telephone number that arrives from an inside line has third priority. Specifically, data that indicates the order of priority related to incoming calls is set so that when an incoming call has arrived through a telephone line of another telephone number (second telephone number, third telephone number, fourth telephone number) while there is an incoming call on the telephone line of the first telephone number, the telephone line of the first telephone number is selected with higher priority; the telephone line of the second telephone number is selected with higher priority when an incoming call has arrived through a telephone line of another telephone number (third telephone number, fourth telephone number) while there is an incoming call on the telephone line of the second telephone number; the telephone line of an outside line rather than an inside line is selected with higher priority when an incoming call has arrived through a telephone line of another telephone number (fourth telephone number) while there is an incoming call on the telephone line of the third telephone number.

FIG. 11 is a flowchart showing the operation procedure for a case in which such an incoming call priority order is established. When incoming calls occur substantially simultaneously on a plurality of telephone lines of a IP telephone 60*a* (step S100), the control means 64 selects with priority a prescribed telephone line on the basis of the data of incoming call priority order stored in the various settings storage unit 655, as shown in FIG. 3. Specifically, the control means 64 determines whether the telephone number of the telephone line of an incoming call is the first telephone number (step S111). As a result, when the control means 64 has determined that [the telephone number] is the first telephone number, the telephone line of the first telephone number is selected with priority (step S112) even when there are other telephone lines having incoming calls (the telephone line of the second telephone number, the telephone line of the third telephone number, the telephone line of the fourth telephone number).

Next, when the control means 64 determines that the telephone number of the telephone line that has an incoming call is not a first telephone number, the control means 64 determines whether the telephone number of the telephone line having an incoming call is a second telephone number (step S113). As a result, when the control means 64 has determined that the telephone number of the telephone line having an incoming call is the second telephone number, the telephone line of the second telephone number is selected with priority (step S114) even when there is another telephone line having an incoming call (the telephone line of the third telephone number, the telephone line of the fourth telephone number).

Next, when the control means 64 determines that the telephone number of the telephone line that has an incoming call is not a first or second telephone number, the control means 64 determines that the telephone line having an incoming call is an outside line (step S115). As a result, when the control means 64 has determined that the telephone number of the telephone line having an incoming call is an outside line, the process advances to step S117 and [the control means 64] determines whether the telephone line having an incoming call is a third telephone number. When the telephone line having an incoming call is determined to be the third telephone number, the telephone line of the third telephone number is selected with priority (S119) even when there is another telephone line having an incoming call (the telephone line of the fourth telephone number). On the other hand, when the control means 64 determines that telephone line having an incoming call is an outside line that is not the fourth telephone number, the telephone line of the fourth telephone number is selected with priority (step S118) even when there is another telephone line having an incoming call.

When the control means 64 determines that the telephone line having an incoming call is not an outside line in the routine of step S115, the line is determined to be an inside line (step S116), the process moves to immediately prior to step S117, and a prescribed telephone line is selected.

In this manner, an incoming call priority pattern can be implemented that involves three elements, i.e., telephone lines that correspond to prescribed telephone numbers on the call receiving side, telephone lines that correspond to telephone numbers that arrive from outside lines, and telephone lines that correspond to telephone numbers that arrive from inside lines. As a result, the incoming call priority pattern can be provided with leeway, utility and generality can be considerably improved, and the incoming call priority pattern can be set in a manner that sufficiently satisfies the demands of users.

When an incoming call arrives from the exterior (outside telephone line) or the interior (inside telephone line) to a prescribed IP telephone 60*a* and the like in an IP telephone such as those shown in FIGS. 1 and 4, a setting can be established (control) on the SIP server 40 side so that the call can be transferred (unconditional transfer) to another IP telephone. In this case, no incoming calls at all will arrive at an IP telephone that has been set for transfers.

In this case, when a user of an IP telephone that has been set for transfers is not aware that the transfer setting has been set on the SIP server 40 side, incoming calls will not arrive at the IP telephone until the transfer setting from the SIP server 40 is cancelled. It is also possible to set up transfers from one's own IP telephone to the SIP server 40, but when the user forgets to make the transfer setting, incoming calls will not arrive at the IP telephone until the user remembers to set the transfer setting and cancel the transfer setting that is set in the SIP server 40. As a result, there is a drawback in that incoming calls will not arrive at the IP telephone when [the user] is waiting for a call from an important counterpart, or in other situations.

In view of this situation, the state of the transfer setting can be displayed on the IP telephone 60*a* and the like shown in FIGS. 1 and 4 for the users of the IP telephone 60*a* and the like. The description below will focus mainly on the IP telephone 60*a*, but the same applies to the other IP telephone 60*b*, IP telephone 60*c*, or the like.

The control means 64 organically controls the driving of the constituent elements of the IP telephone 60*a* and integrally controls communication processes that involve the IP network. The control means 64 can set a transfer mode (transfer setting) that transfers [calls] to another IP telephone 60*b* and the like when a call is made from the exterior (outside telephone line) or the interior (inside telephone line) to the IP telephone 60*a* by input from the operation input unit 62, and can cancel this transfer mode setting. Specifically, the setting and cancellation of the transfer mode can be implemented by causing the control means 64 of the IP telephone 60*a* to output a control signal to the CPU 41 of the SIP server 40. Also, information related to the transfer destination is inputted from the operation input unit 62, whereby [the information] can be registered (stored) in the RAM 43 of the SIP server 40. The transfer setting is also stored in the various settings storage unit 655 of the selfsame IP telephone 60*a*.

The display unit 61 is an output interface for displaying to the user various information held by the IP telephone 60*a*. The display unit 61 is controlled based on control signals from the CPU 41 of the SIP server 40, and when the IP telephone 60*a* is set in the transfer mode, a message indicating that the transfer mode has been set, as well as information (e.g., the telephone number of the transfer destination, the name, the place, and other information) related to the transfer destination, are displayed on the display unit 61.

In addition to the display unit 61, a display unit 61 (e.g., LED lamp or the like) may be provided to the IP telephone 60*a* to indicate that the transfer mode has been set, and when the transfer mode has been set, this fact may be displayed (e.g., the LED lamp is lighted or otherwise activated) on the display unit.

The SIP server 40 is a communication controller that controls communications of the IP telephone 60*a* and the like by using SIP (Session Initiation Protocol). SIP is one type of communication control protocol provided with a transfer function, caller number notification function, and other functions, and has a characteristic in which the time required to make a connection is shorter than the protocol of similar systems. The SIP server 40 is provided with a register server in which a client (e.g., IP telephones 60a, 60b, and 60c) registers an address, and is also provided with a proxy server that searches addresses in place of the client, a redirect server that transfers to another address a connection request that has been received from the client, and other functions.

The SIP server 40 has a CPU 41, a RAM 43, and an operation input unit 42. The CPU 41 sets or cancels the transfer mode for making a transfer to another IP telephone 60b, 60c, or the like when a call is made from the outside (outside telephone line) or the inside (inside telephone line) to a prescribed IP telephone 60a. The RAM 43 stores, as data, information (e.g., the telephone number, the name, and the installed location of the IP telephones 60b, 60c, or the like of the transfer destination) related to the other IP telephones 60b, 60c, or the like, which are transfer destinations. The operation input unit 42 is used to input information for setting the transfer mode in the CPU 41, and information for canceling the transfer mode. New information related to the IP telephones 60b, 60c, or the like, which are transfer destinations, is stored in the RAM 43, whereby information related to the IP telephones 60b, 60c, or the like is updated, and new transfer destinations can be set.

FIG. 12 is a flowchart showing the above-described procedure. First, the CPU 41 of the SIP server 40 determines whether the transfer mode is set (step S120). When the CPU 41 of the SIP server 40 determines that the transfer mode is set, [the CPU 41] determines whether the information related to the IP telephone of the transfer destination has been changed (step S121). When [the CPU 41] determines that the information related to the IP telephone of the transfer destination has not been changed, a message (e.g., "In transfer mode," or the like) indicating that the transfer mode has been set, as well as information (e.g., the telephone number of the IP telephone of the transfer destination, the name, the place, and other information) indicating the transfer destination, are displayed on the display unit 61 of the IP telephone 60a (step S123).

On the other hand, when it is determined that the information related to the IP telephone of the transfer destination has been modified, a message (e.g., "In transfer mode," or the like) indicating that the transfer mode has been set, a message (e.g., "transfer changed," or the like) indicating that a change has been made, and information (e.g., the telephone number of the IP telephone of the changed destination, the name, the place, and other information) indicating the changed destination are displayed on the display unit 61 of the IP telephone 60a (step S124).

As described above, control of the CPU 41 of the SIP server 40 provides a setting whereby calls to the IP telephone 60a are transferred from the IP telephone 60a to another IP telephone 60b, 60c, or the like. The fact that such a transfer has been set is displayed on the display unit 61 of the IP telephone 60a, whereby the user of the IP telephone 60a can know that the IP telephone 60a is set for the transfer by confirming the fact displayed on the display unit 61.

In particular, the user of the IP telephone 60a can also know the information of the transfer destination because the transfer destination information, which is the information of the transfer destination, is displayed on the display unit 61. As a result, the existence of an incoming call, the content of an incoming call, and other information set for to be transferred from the IP telephone 60a of the user to another IP telephone 60b, 60c, or the like can be known from the users of the IP telephones 60b and 60c, which are the transfer destinations.

When a change has been made to the content related to the transfer settings, the changed content is displayed on the display unit 61 of the IP telephone 60a, whereby the user of the IP telephone 60a can known each time the content of the transfer settings has changed.

Facts related to the transfer settings, as well as the transfer destination or the changed destination, are preferably displayed on the display unit 61 of the IP telephone 60a when the IP telephone 60a is started up. The user can thereby confirm all of the contents related to the transfer settings each time the IP telephone 60a is started up.

As described above, a plurality of telephone lines can be connected to telephone devices, and not only to an IP telephone. When group incoming calls are possible, a plurality of telephone numbers such as personal telephone numbers and group telephone numbers is set in each IP telephone 60a. When the incoming call entry is stored in a telephone device having a plurality of telephone numbers in this manner, the incoming call entry as such is handled as a single file and is stored in incoming call order in an incoming call entry storage unit disposed in the telephone device without differentiating between incoming telephone numbers.

In a telephone device in which personal telephone numbers and group telephone numbers are set, connections of incoming calls to a group telephone number can be answered at any telephone device that belongs to the group, and such a connection is not necessarily an incoming call to oneself. In contrast to this situation, connections of incoming calls to a personal telephone number are nearly always addressed to oneself.

In such a case, the number of incoming call histories that can be stored in memory that stores the incoming call histories is limited and is not infinite. Therefore, a request is generated to store incoming call histories only for calls to a personal telephone number, without incoming call entries for a group telephone number being stored for different users. Also, when referencing an incoming call entry, it is convenient to reference only the incoming call entry of oneself without the need to identify the incoming call entry to oneself from among incoming call histories not addressed to oneself, [which is possible] as long as only incoming calls to a personal telephone number are stored.

The memory capacity for storing incoming call histories is limited. Therefore, when an incoming call exceeds the maximum number of entries that can be stored, the oldest incoming call entry is deleted from the incoming call entry storage unit, and the most recent incoming call entry is stored whether or not the user has referenced the incoming call entry. Therefore, when an incoming call entry is stored that is not required for the user, the incoming call entry that is actually required may be inadvertently deleted, and situation may occur in which the user cannot reference a required incoming call entry. There is furthermore a possibility that the ratio of the number of useful entries relative to the maximum number of storable entries will become very low. In such a case, incoming call entries as such will reach a state in which the entries cannot be effectively used.

The criterion for determining whether or not missed incoming call entries for each telephone number is useful will differ for each user. For example, missed incoming call entries to the same group telephone number may be necessary for some people but unnecessary for others.

For this reason, a user can set the IP telephone 60a or the like shown in FIGS. 1 and 4 to store or not store incoming call entries to each telephone number for each IP telephone. In the description below, the IP telephone 60a or the like are referred to as terminals, the configuration is one in which terminals A through N are network connected, and a group of connected IP telephones (terminals), e.g., terminals A to D, is set as a group of incoming call terminals when an incoming call has arrived at a prescribed group telephone number, and the incoming call is made to arrive at one of the terminals. Therefore, the terminals A to D are set so as to have personal telephone numbers that are assigned to individual users in addition to having a group telephone number. The SIP server 40 delivers an incoming call addressed to the group telephone number to any of the terminals A to D, and delivers an incoming call to a personal telephone number to the corresponding terminal.

The SIP server 40 is provided with a CPU 41 that performs control functions, and the CPU 41 controls the incoming calls to terminals. A plurality of telephone numbers set in the terminals is stored in the RAM 43. For example, data stored in the RAM 43 is configured so that group telephone numbers set for each terminal are stored in the telephone number settings A, and personal telephone numbers, home-use telephone numbers, and other telephone numbers set for each terminal are stored in the telephone number settings B and telephone number settings C, as shown in FIG. 13. The CPU 41 controls the connection to the terminal that corresponds to the incoming call by using the terminal ID and the telephone number stored in the RAM 43.

In FIG. 13, group telephone numbers set in each terminal and the incoming call order are stored in the telephone number settings A. For example, in the present example, the terminal ID of terminals A to D is registered to group telephone number ****, and the incoming call order "1" to "4" is set in the order of terminals A to D as the incoming call order. When a plurality of group telephone numbers is set, the group and incoming call order of the terminal to which an incoming call will arrive are set in the same manner as terminals A to D.

On the other hand, terminals A to N are provided with a various settings storage unit 655 that sets whether or not to leave an incoming call entry for each telephone number that has been established, and the incoming call entries are sequentially stored in a prescribed area of the memory 65.

The terminals A to N can register as an incoming call entry setting whether or not to store an incoming call entry in the memory 65 for each telephone number when an incoming call has been missed. The control means 64 detects the incoming call telephone number (the group telephone number or personal telephone number set in the corresponding terminal) when an missed incoming call has been delivered from the SIP server 40, refers to the telephone number or the like registered in the various settings storage unit 655, and stores the incoming call entry in the memory 65.

For example, a group telephone number (group **) and a personal telephone number (-**-) are assigned to terminal A. Incoming call entry settings are set in the various settings storage unit 655 by the user of terminal A, as shown in FIG. 14. In other words, in FIG. 14**, entry storage for the group telephone number is set to "OFF" (incoming call entry will not be stored), and entry storage of the personal telephone number is set to "ON"[1] (incoming call entry will be stored). However, an incoming call entry (i.e., an attended call) for the case in which the user of a telephone device has actually answered [the phone] will be stored regardless of the setting.

The setting signifies that only missed calls to the personal telephone number will be recorded in the incoming call entry, and the control means 64 detects the incoming call telephone number when an incoming call has arrived from the SIP server 40. If [the incoming call] is a missed call to the personal telephone number, the incoming call entry will be stored in the memory 65. In the case that the group telephone number and the personal telephone number are both set for incoming call entry storage (both settings are set to "ON") the control means 64 will store the incoming call entry in the memory 65 when a missed call occurs for either the personal telephone number or the group telephone number.

FIG. 15 is a diagram showing an example of the incoming call entry stored in the memory 65 in the manner described above. In FIG. 15, the terminals (any of the terminals A to D) have settings "9999" (group telephone number), "1111" (personal telephone number 1 for business use), and "2222" (personal telephone number 2 for home and family use) as the selfsame telephone number. All of the established telephone numbers are set to "ON" in the incoming call entry settings registered in the various settings storage unit 655, and the control means 64 will store all incoming call entries in the memory 65 when a missed call occurs for any of the telephone numbers.

The configuration of an incoming call entry stored in the memory 65 is shown in FIG. 15, i.e., entry number, type (missed), incoming call time, selfsame telephone number (incoming call telephone number), counterpart telephone number, counterpart name (stored as "unknown" the name is unknown). The entry number is controlled by assigning "1" to the most recent incoming call entry and sequentially assigning numbers from the newer incoming call. The most recent incoming call entry is "1" when the most recent incoming call entry is stored, and the entry number is thereafter sequentially incremented down the list.

In FIG. 15, the maximum number of entries is simplified and set to five entries of the sake of description. Here, it is assumed that the user of this terminal does not require a missed incoming call entry to the group telephone number "9999." In this case, three of the five entries are missed incoming call entry entries to the group telephone number, which is not required, and only two useful incoming call entries to the personal telephone numbers "1111" and "2222" are stored. Therefore, the utilization ratio of the incoming call entry is poor, which also makes the viewability of the incoming call entry list worse.

Also, in this state, when another missed incoming call arrives at the group telephone number "9999," the missed incoming call entries for the personal telephone number "2222" will overflow due to the maximum number of entries, and the entry will be unavoidably deleted from the incoming call entry list regardless of whether the user has already referenced the entry.

Therefore, even when the person who was away from his desk returns, sees a popup message "missed call," and references the incoming call entries, the person will on be able to confirm the call because an important missed incoming call entry has already been lost, resulting in a possible disadvantageous situation.

In view of this situation, if the user sets missed incoming call entries to not be stored for the group telephone number "9999," only calls the user has determined to be useful will be stored; i.e., all incoming call entries for the personal telephone numbers "1111" and "2222", as well as incoming call entries (the incoming call log of answered calls rather than missed calls) to the group telephone number "9999" to which the user has actually responded; and the incoming call entry storage area of the memory 64 can be effectively used.

Next, control whereby incoming calls destined to a group telephone number are connected by the SIP server 40 to the terminals A to D will be described. When an incoming call for the group telephone number has arrived, the CPU 41 searches and selects a terminal to connect the incoming call to on the basis of the information set in the RAM 43 (see FIG. 13). When the sequential search method is used, the incoming call order set in the terminals A to D is the order of priority. The terminals are searched in accordance with the order of priority, and if a terminal is open, the incoming call will be connected to that terminal.

Specifically, the search will be made in sequence from the terminal having the highest priority, and if that terminal is open, a connection to that terminal will made immediately. Therefore, in the case of FIG. 13, the search will be carried out in sequence from terminal A, and if terminal A is open, the incoming call will be connected to terminal A. If terminal A already has a call or is otherwise busy and is not open, the terminal that is second in the order of priority (terminal B, in this case) is searched, and if terminal B is open, a connection will be made to terminal B.

The search order may also be a round robin method. The incoming call order of the terminals set in the column titled "incoming call order" refers to the selection order in which the terminal to be searched first is changed each time there is an incoming call to an administration number. Terminal A is searched first for the first incoming call to a group telephone number, terminal B is searched first for the second incoming call, terminal C is searched first for the third incoming call, and terminal D is searched first for the fourth incoming call. When the search order has completed a cycle, the sequence will return to the start for the fifth incoming call, and terminal A will be searched first. If the searched terminal already has a call and is not open, the next terminal will be searched, and the incoming call to an administration number will be connected to an open terminal.

In such a round robin method, the incoming call order of terminals set in the column titled "incoming call order" is the order in which a sequential shift is made each time the group telephone number has an incoming call, and is the order that indicates the selection order for searching for an open IP telephone. When the sequential search method is used, the incoming call will arrive with highest priority at the terminal having the highest priority, and the number of incoming calls to that terminal will occur most often. In contrast, when the round robin method is used, incoming calls can be substantially uniformly delivered to each terminal.

Incoming call control to group telephone numbers may be carried out by causing all of the terminals to ring at an incoming call rather than using the methods described above. All of the telephone devices in a group will ring together when an incoming call arrives at a group number that is set so that all of the terminals will ring in response to an incoming call to a group number, and when one of the telephone device is answered, the incoming call is cancelled for all the other telephone devices that were not answered.

In accordance with such a configuration, the user of a telephone device for which a plurality of telephone numbers is established can select to save incoming call entries for each telephone number in accordance with the usage mode thereof, and only the incoming call entries that the user deems necessary can be retained. Therefore, the incoming call entry storage area of limited memory can be effectively used, the danger of required incoming call entries being deleted before reference is made can be reduced, and only required incoming call entries are saved. Therefore, entries that the user desires to reference can be easily identified.

Since there is a limit to the storage capacity of the memory 65 that stores the missed incoming call entries, the drawback in which very important incoming call entries are deleted from memory can be overcome when group incoming call entries are set to be saved for a short period of time and are automatically deleted after a set period of time in a case in which the incoming call entries for a group telephone number are set to be saved. A configuration may also be adopted in which the save time period of missed incoming call entries for a personal telephone number is set to a desired length of time, whereby the incoming call entry storage area of the memory 65 can be effectively used in accordance with the usage state of the IP telephone.

A configuration may also be adopted in which the necessity of saving missed incoming call entries for each telephone number is set in the incoming call entries registered in the various settings storage unit 655, the save time period of the missed incoming call entries can be set for a group telephone number or other telephone number, and the missed incoming call entries for which the save period has elapsed are deleted (erased) when the control means 64 stores the missed incoming call entries in the memory 65.

The example described above was an example of an IP telephone, but the same applies to general private telephones. Also, the example described above was an example of incoming call entry storage control for group telephone numbers and personal telephone numbers, but it is also possible to save the incoming call entries for missed incoming calls of outside telephone numbers and not save incoming call entries for missed calls of internal telephone numbers, to save the incoming call entries for missed incoming calls of company telephone numbers and not save incoming call entries for missed calls of home telephone numbers, or to adopt other settings.

In the example described above, focus was placed on the features of group telephone numbers in which incoming calls to an IP telephone can be received and answered with other IP telephones as well, but this feature of group telephone numbers also includes the possibility that a user who has viewed an incoming call entry makes a return call without knowing that another IP telephone of the same group has returned the call, resulting in a double returned call.

For this reason, when a call has been returned, the SIP server 40 or the IP telephone preferably notifies other IP telephones of the same group that the call has been returned. This notification is furthermore preferably carried out automatically, and a possible method of doing so is to regard as a return call the outgoing call operation related to the notification of the missed incoming call entry, and to notify other IP telephones that the call has been returned. For example, when returning a call to the second entry on the missed incoming call entry display, it is possible to adopt a method in which the cursor is moved to the second entry or the key for the number 2 is pressed, and the outgoing call key is then pressed, whereupon the call is determined to have been returned, and when the numerical key pad is used to enter the telephone number, the call is not determined to have been returned. The notification method of a return call may also be one in which the missed incoming call entry is erased and the number of the IP telephone that made the return call is displayed with the missed incoming call number, whereby it can be known that someone has returned the call.

The invention claimed is:

1. Telephone that registers a presence state in a presence server having a presence management information storage unit for storing in each telephone the presence state of a user of the telephone, said telephone characterized in comprising:
   a presence detector for detecting the presence state of a user;
   a presence state storage unit for storing the presence state detected by said presence detector; and
   a controller having a presence modification function for changing the presence information stored in the presence state storage unit in accordance with the presence state of the user detected by said presence detector, wherein said controller changes the presence information stored in said presence state storage unit to presence information that indicates presence when said presence detector has detected that the user is present;

said controller changes the presence information stored in said presence state storage unit to presence information that indicates not present when said presence detector has detected that the user is not present; and said controller registers in said presence server presence information stored in the presence state storage unit, said telephone further comprises a voice recognition unit for recognizing a voice of the user of the telephone, and said presence detector detects the presence of the user when said voice recognition unit detects the voice of the user, and detects that the user is not present when the voice of the user is not detected for a prescribed interval set in advance.

2. The telephone according to claim 1, characterized in further comprising a presence table for enabling or disabling a presence modification action that changes presence information stored in said presence state storage unit for each of the presence states in accordance with the presence state detected by said presence detector.

3. The telephone according to claim 1, characterized in that said presence detector detects an outgoing call made by the user of the telephone and detects the presence of the user, and detects that the user is not present when an outgoing call has not been detected for a prescribed interval set in advance.

4. The telephone according to claim 1, characterized in that said telephone further comprises a charger for charging a mobile phone owned by the user of telephone, wherein said presence detector detects the presence of the user when the mobile phone owned by said user is set on said charger, and detects that the user is not present when the mobile phone is not set on said charger.

5. A telephone that registers a presence state in a presence server having a presence management information storage unit for storing in each telephone the presence state of a user of the telephone, said telephone comprising:

an operation input unit that includes a remote button for enabling a remote function for changing the presence information of another telephone; and a presence state storage unit for storing the presence state of a user, wherein the remote button is enabled from said operation input unit and remote terminal registration is carried out in said presence server, and presence information of said other telephone inputted from said operation input unit is registered in said presence server when said remote button has been operated, said telephone further comprises:

a voice recognition unit for recognizing a voice of the user of the telephone and a presence detector that detects the presence of the user when said voice recognition unit detects the voice of the user, and detects that the user is not present when the voice of the user is not detected for a prescribed interval set in advance, a controller that changes the presence information stored in said presence state storage unit to presence information that indicates presence when said presence detector has detected that the user is present;

said controller changes the presence information stored in said presence state storage unit to presence information that indicates not present when said presence detector has detected that the user is not present; and said controller registers in said presence server presence information stored in the presence state storage unit.

6. The telephone according to claim 5, characterized in that said telephone receives notification of the changed presence information from said presence server each time the presence information registered in said presence server is changed from said other telephone when said remote button is enabled and the remote terminal registration is carried out in said presence server.

7. The telephone according to claim 5, characterized in that said telephone acquires presence information of said other telephone at a prescribed timing when said remote button is enabled and the remote terminal registration is carried out in said presence server.

8. A method of controlling a telephone that registers a presence state in a presence server having a presence management information storage unit for storing in each telephone the presence state of a user of the telephone, wherein said telephone comprises:

a presence detector for detecting the presence state of a user;

a presence state storage unit for storing the presence state detected by said presence detector and a controller having a presence modification function for changing the presence information stored in the presence state storage unit in accordance with the presence state of the user detected by said presence detector the method comprising:

a step in which said controller changes the presence information stored in said presence state storage unit to presence information that indicates presence when said presence detector has detected that the user is present;

a step in which said controller changes the presence information stored in said presence state storage unit to presence information that indicates not present when said presence detector has detected that the user is not present; and a step in which said controller registers in said presence server presence information stored in the presence state storage unit, said telephone further comprises:

a voice recognition unit for recognizing a voice of the user of the telephone, and said presence detector detects the presence of the user when said voice recognition unit detects the voice of the user, and detects that the user is not present when the voice of the user is not detected for a prescribed interval set in advance.

9. The method of controlling a telephone according to claim 8, characterized in that said telephone further comprises a presence table for enabling or disabling a presence modification function that changes presence information stored in said presence state storage unit for each of the presence states in accordance with the presence state detected by said presence detector and the method of controlling said telephone further comprises a step of enabling or disabling said presence modification function by rewriting said presence table using an input device.

10. The method of controlling a telephone according to claim 8, characterized in that the step of changing said presence information includes a process in which said presence detector detects an outgoing call made by the user of the telephone and detects the presence of the user, and detects that the user is not present when an outgoing call has not been detected for a prescribed interval set in advance.

11. The method of controlling a telephone according to claim 8, characterized in that said telephone further comprises a voice recognition unit for recognizing the voice of the user of the telephone, and the step of changing said presence information includes a process in which said presence detector detects the presence of the user when said voice recognition unit detects the voice of the user, and detects that the user is not present when the voice of the user is not detected for a prescribed interval set in advance.

12. The method of controlling a telephone according to claim 8, characterized in that said telephone further comprises a charger for charging a mobile phone owned by the user of the telephone, and the step for changing said presence information includes a process in which said presence detector detects the presence of the user when the mobile phone owned by said user is set on said charger, and detects that the user is not present when the mobile phone is not set on said charger.

13. A method of controlling a telephone that registers a presence state in a presence server having a presence management information storage unit for storing in each telephone the presence state of a user of the telephone, wherein said telephone comprises an operation input unit that includes a remote button for enabling a remote function for changing the presence information of another telephone, and a presence state storage unit for storing the presence state of a user, the method comprising:

a step for enabling the remote button from said operation input unit and carrying out remote
terminal registration in said presence server; and a step for registering, in said presence server, presence information of said other telephone
inputted from said operation input unit when said remote button has been operated, said telephone further comprises:

a voice recognition unit for recognizing a voice of the user of the telephone and a presence detector that detects the presence of the user when said voice recognition unit detects the voice of the user, and detects that the user is not present when the voice of the user is not detected for a prescribed interval set in advance, a controller that changes the presence information stored in said presence state storage unit to presence information that indicates presence when said presence detector has detected that the user is present;

said controller changes the presence information stored in said presence state storage unit to presence information that indicates not present when said presence detector has detected that the user is not present; and said controller registers in said presence server presence information stored in the presence state storage unit.

14. The method of controlling a telephone according to claim 13, characterized by further having a step in which said telephone receives notification of the changed presence information from said presence server each time the presence information registered in said presence server is changed from said other telephone when said remote button is enabled and the remote terminal registration is carried out in said presence server.

15. The method of controlling a telephone according to claim 13, characterized by further having a step in which said telephone acquires presence information of said other telephone at a prescribed timing when said remote button is enabled and the remote terminal registration is carried out in said presence server.

* * * * *